(12) United States Patent  
Suzuki et al.

(10) Patent No.: US 8,737,181 B2
(45) Date of Patent: May 27, 2014

(54) OPTICAL RECORDING MEDIUM, RECORDING/REPRODUCING APPARATUS, RECORDING/REPRODUCING METHOD

(75) Inventors: Yoshinori Suzuki, Kanagawa (JP); Kazuhiko Fujie, Kanagawa (JP); Koji Sekiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/554,767

(22) Filed: Jul. 20, 2012

(65) Prior Publication Data

US 2013/0033973 A1  Feb. 7, 2013

(30) Foreign Application Priority Data

Aug. 1, 2011  (JP) ................................. 2011-167952

(51) Int. Cl.
*G11B 7/00* (2006.01)
(52) U.S. Cl.
USPC .................. 369/47.32; 369/44.28; 369/44.29; 369/59.11
(58) Field of Classification Search
USPC ....................... 369/59.25, 47.53, 44.29, 44.32
See application file for complete search history.

(56) References Cited

U.S. PATENT DOCUMENTS

| | | | | |
|---|---|---|---|---|
| 4,901,300 A | * | 2/1990 | Van Der Zande et al. ... | 369/47.4 |
| 4,949,332 A | * | 8/1990 | Veenis et al. ................ | 369/275.3 |
| 5,295,127 A | * | 3/1994 | Verboom et al. ........... | 369/53.24 |
| 5,303,217 A | * | 4/1994 | Bakx et al. ................. | 369/47.53 |
| 5,331,626 A | * | 7/1994 | Sugiura ...................... | 369/275.1 |
| 5,377,178 A | * | 12/1994 | Saito et al. ............... | 369/124.07 |
| 5,572,507 A | * | 11/1996 | Ozaki et al. ................ | 369/53.21 |
| 5,754,505 A | * | 5/1998 | Saeki ......................... | 369/44.26 |
| 5,793,738 A | * | 8/1998 | Fukushima et al. ....... | 369/47.19 |
| 5,930,228 A | * | 7/1999 | Miyamoto et al. ......... | 369/275.4 |
| 6,181,658 B1 | * | 1/2001 | Van Den Enden et al. | 369/59.25 |
| 7,313,062 B2 | * | 12/2007 | Kobayashi .................. | 369/47.1 |
| 7,609,605 B2 | * | 10/2009 | Hirokane et al. .......... | 369/59.25 |
| 7,916,607 B2 | * | 3/2011 | Kanda et al. ............... | 369/59.25 |
| 7,965,593 B2 | * | 6/2011 | Shoji et al. ................. | 369/44.29 |
| 2002/0071355 A1 | * | 6/2002 | Miyamoto et al. ......... | 369/44.13 |
| 2009/0135712 A1 | * | 5/2009 | Kim et al. .................... | 369/300 |
| 2013/0070577 A1 | * | 3/2013 | Suzuki et al. ............. | 369/30.03 |

FOREIGN PATENT DOCUMENTS

| | | |
|---|---|---|
| JP | 2006-073087 | 3/2006 |
| JP | 2009-134780 | 6/2009 |
| JP | 2010-033688 | 2/2010 |

* cited by examiner

*Primary Examiner* — Van Chow

(74) *Attorney, Agent, or Firm* — K&L Gates LLP

(57) ABSTRACT

Provided is an optical recording medium, including a recording target track that is a track on which small record carriers are arranged and on which information recording is performed by modulating the small record carriers through light irradiation; and a wobbling track on which the small record carriers are arranged in a wobbling manner, wherein a single wobbling track is formed to run parallel to a set of a plurality of recording target tracks.

10 Claims, 17 Drawing Sheets

FIG.5
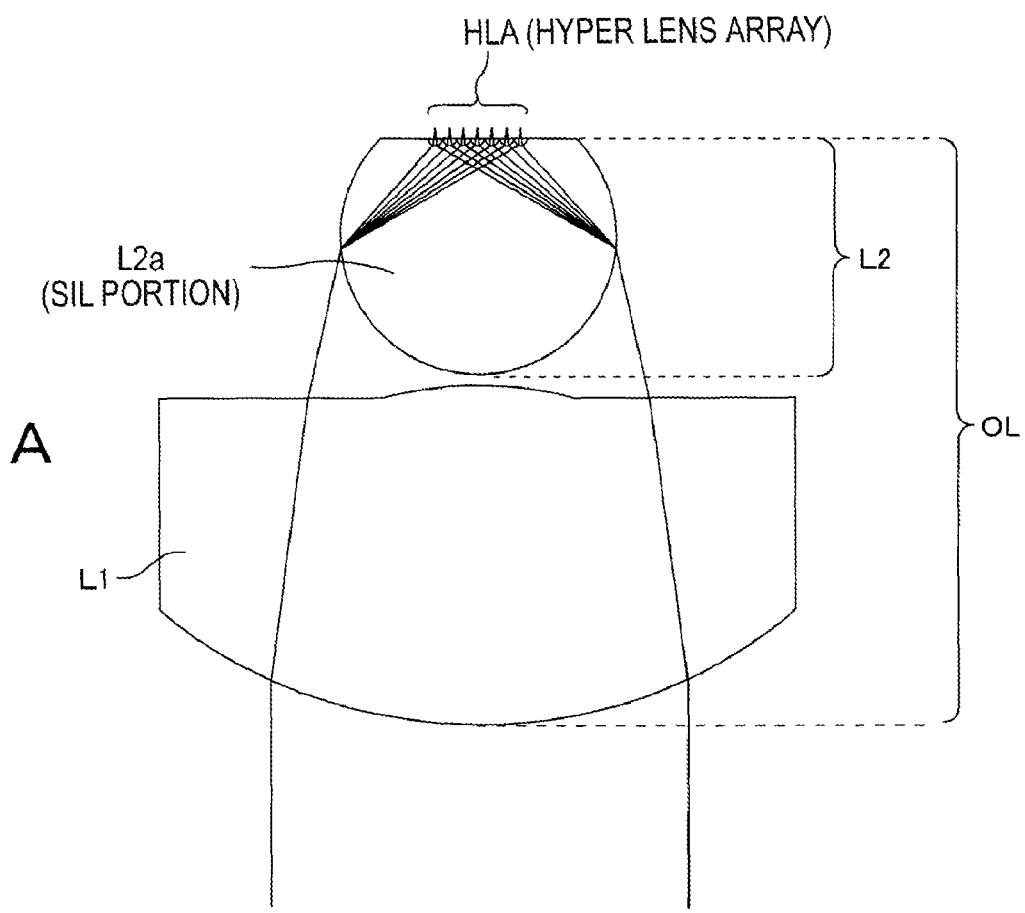
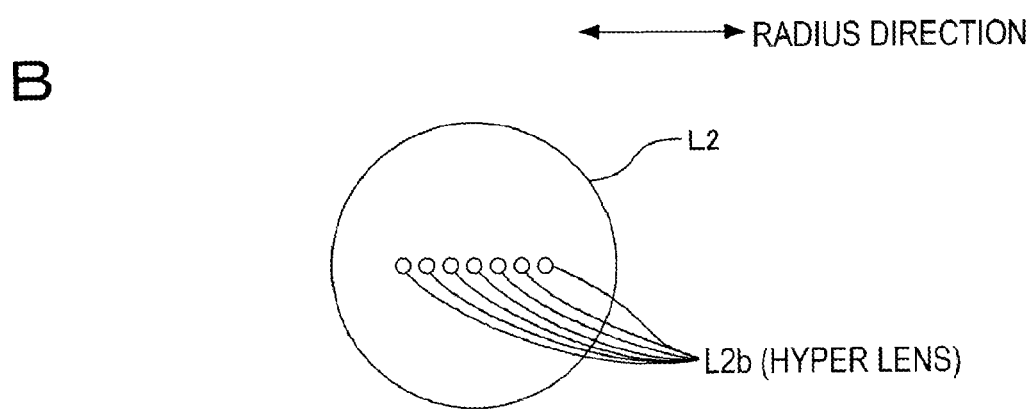

FIG.8
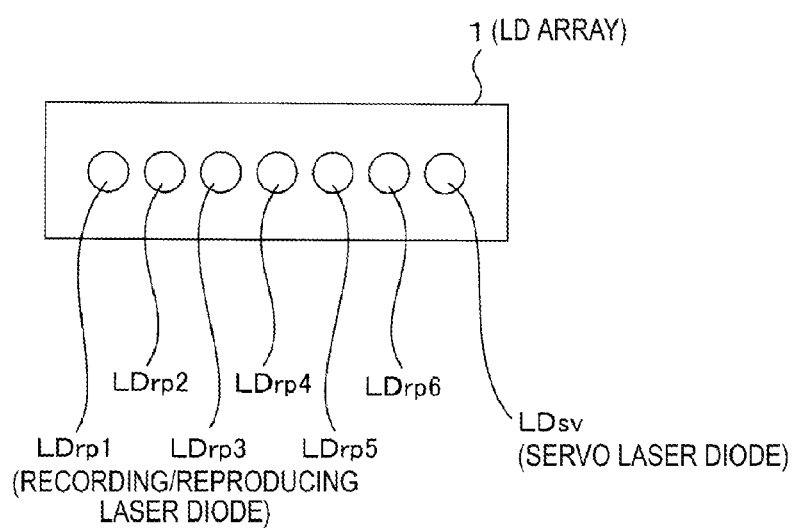
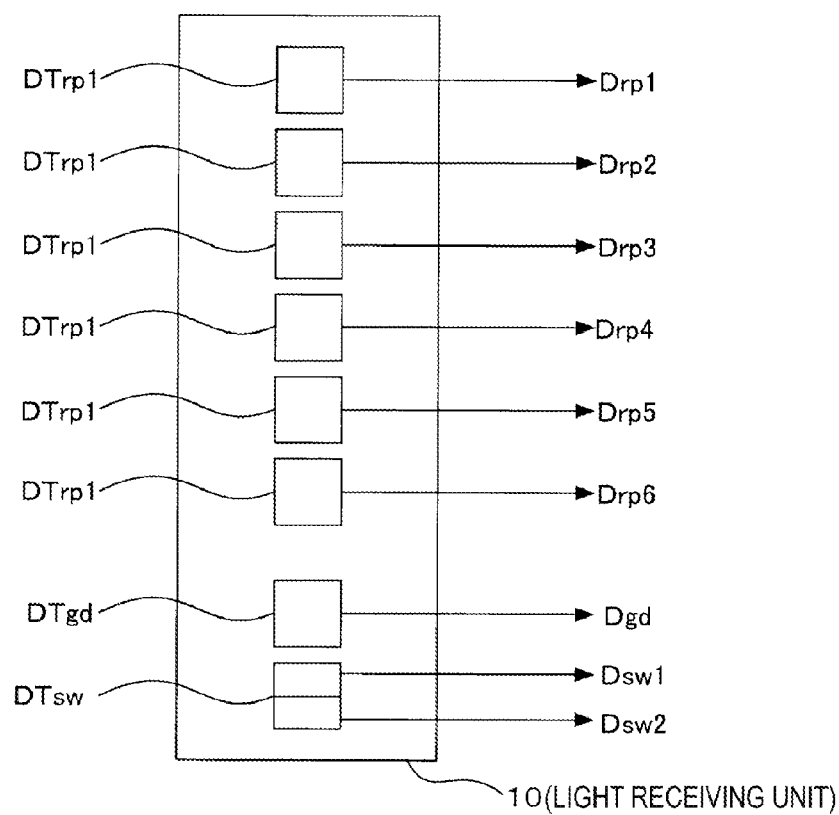

OPTICAL RECORDING MEDIUM, RECORDING/REPRODUCING APPARATUS, RECORDING/REPRODUCING METHOD

CROSS REFERENCES TO RELATED APPLICATIONS

The present application claims priority to Japanese Priority Patent Application JP 2011-167952 filed in the Japan Patent Office on Aug. 1, 2011, the entire content of which is hereby incorporated by reference.

BACKGROUND

The present application relates to an optical recording medium used as a pattern medium in which a track on which a plurality of small record carriers in which a record state is held by modulation corresponding to irradiation of light are arranged is formed, and recording information is expressed by a record/non-record (or erase) pattern of the small record carrier on the track.

Further, the present application relates to a recording/reproducing apparatus and method which perform recording and reproducing on an optical recording medium used as a pattern medium.

For example, a so-called optical disc recording medium (which may also be referred to simply as an "optical disc") such as a compact disc (CD), a digital versatile disc (DVD), and a Blu-ray disc (BD) (a registered trademark) has widely been spread as an optical recording medium that records and reproduces information by irradiation of light.

On optical discs, a reduction in a wavelength of recording/reproducing light and an increase in a numerical aperture of an objective lens are being made. Thus, a beam spot size for recording/reproducing is reduced, leading to a high recording capacity and high recording density.

However, in optical discs, air is used as a medium between an objective lens and the optical disc, and it is difficult to increase the numerical aperture NA having influence on the size (diameter) of a focus spot to be larger than "1".

Specifically, when a numerical aperture of an objective lens is $NA_{obj}$, and a wavelength of light is $\lambda$, the size of a spot of light that irradiates onto an optical disc through an objective lens is expressed as follows:

$$\lambda/NA_{obj}$$

At this time, when a refractive index of a medium interposed between the objective lens and the optical disc is $n_A$, and an incident angle of a light beam around the objective lens is $\theta$, the numerical aperture $NA_{obj}$ is expressed as follows:

$$NA_{obj} = n_A \times \sin\theta$$

As can be seen from this formula, it is difficult to increase the numerical aperture $NA_{obj}$ to be larger than 1 as long as a medium is air ($n_A = 1$).

In this regard, recording/reproducing methods (a near field method) that implement $NA_{obj} > 1$ using near-field light (evanescent light) have been proposed as disclosed in Japanese Patent Application Laid-Open (JP-A) No. 2010-33688, Japanese Patent Application Laid-Open (JP-A) No. 2009-134780, and the like.

This near field method is known to record or reproduce information by irradiating an optical disc with near-field light, and a solid immersion lens (hereinafter referred to as a "SIL") is used as an objective lens used to irradiate the optical disc with near-field light (for example, see JP-A No. 2010-33688 and JP-A No. 2009-134780).

FIG. 17 is a diagram to describe a near field optical system of a related art using an SIL.

FIG. 17 illustrates an example in which an SIL of a super hemispherical shape (super hemispherical SIL) is used as an SIL. Specifically, in the super hemispherical SIL in this case, an object side (that is, a side facing a recording medium which is a recording/reproducing target) has a planar shape, and the other portions have a super hemispherical shape.

In this case, an objective lens is configured as a two-group lens including the super hemispherical SIL as a front lens. As shown in FIG. 17, a double-sided aspherical lens is used as a rear lens.

Here, when an incident angle of incident light is $\theta_i$, and a refractive index of a constitutional material of the super hemispherical SIL is $n_{SIL}$, an effective numerical aperture NA of the objective lens having the configuration illustrated in FIG. 17 is expressed as follows:

$$NA = n_{SIL} \times \sin\theta_i$$

Through this formula, when the configuration of the objective lens illustrated in FIG. 17 is employed, the effective numerical aperture NA can be larger than "1" by setting the refractive index $n_{SIL}$ of the SIL to be larger than "1" (larger than a refractive index of air).

In the related arts, for example, the refractive index $n_{SIL}$ of the SIL is set at about 2, and thus the effective numerical aperture NA of about 1.8 is implemented.

Here, in the near field optical system, an SIL of a hemispherical shape (hemispherical SIL) as well as the super hemispherical SIL is used.

When the hemispherical SIL is used for the objective lens instead of the super hemispherical SIL illustrated in FIG. 17, an effective numerical aperture NA is as follows:

$$NA = n_{SIL} \times \sin\theta_i$$

Through this formula, even when the hemispherical SIL is used, when a high refractive index material of $n_{SIL}$ is used as a constitutional material of an SIL, NA>1 can be implemented.

At this time, compared with the formula in the case of the super hemispherical SIL, when the constitutional material (refractive index) of the SIL is the same in both of the case of the super hemispherical shape and the hemispherical shape, the effective numerical aperture NA in the case of using the super hemispherical SIL is higher.

For the sake of confirmation, in order to perform recording/reproducing propagating (irradiating) light of NA>1 generated by the SIL to a recording medium, it is necessary to arrange an object plane of the SIL and the recording medium to be very close to each other. A distance between an objective surface of the SIL and the recording medium (recording surface) is called a gap.

In the near field method, it is necessary to suppress a gap value to be equal to or less than at least a fourth (¼) a wavelength of light.

Meanwhile, in the related arts, studies on the structure of an optical recording medium have been conducted in order to implement high recording density. For example, the structure of an optical recording medium by a so-called pattern medium has been proposed as disclosed in Japanese Patent Application Laid-Open No. 2006-73087.

Similarly to proposals in a magnetic recording field, a pattern medium is configured such that a track on which small record carriers are arranged is formed, and recording information is expressed by a record/non-record (or erase) pattern of the small record carrier on the track. Specifically, one small record carrier functions as one code ("0" or "1").

Since the small record carrier is independently formed, even if the small record carriers are arranged to be close to one another, that is, even if the small record carriers are arranged with high density, cross light or crosstalk can be suppressed. In other words, the recording density can be increased accordingly.

SUMMARY

In this regard, it is desirable to employ the near field method when recording or reproducing is performed on an optical recording medium based on the pattern medium.

This is because when the near field method is used, as the optical spot size of recording/reproducing is reduced, the density of the small record carriers arranged on the pattern medium increases, and thus the recording capacity can be further increased.

However, a format (standard) to perform regarding near field recording/reproducing on the pattern medium is not concretely established at the present stage.

The present application is made in light of the forgoing, and it is desirable to provide a preferred structure of a pattern medium and a preferred recording/reproducing technique when recording/reproducing by the near field method is performed on the pattern medium.

In order to solve the above problems, an optical recording medium according to the present application employs the following configuration.

That is, according to an embodiment of the present disclosure, there is provided an optical recording medium which includes a recording target track that is a track on which small record carriers are arranged and on which information recording is performed by modulating the small record carriers through light irradiation, and a wobbling track on which the small record carriers are arranged in a wobbling manner, wherein a single wobbling track is formed to run parallel to a set of a plurality of recording target tracks.

Further, a recording/reproducing apparatus according to the present application employs the following configuration.

That is, according to an embodiment of the present disclosure, there is provided a recording/reproducing apparatus that performs recording/reproducing by a near field method on an optical recording medium that includes a recording target track that is a track on which small record carriers are arranged and on which information recording is performed by modulating the small record carriers through light irradiation, and a wobbling track on which the small record carriers are arranged in a wobbling manner, wherein a single wobbling track is formed to run parallel to a set of a plurality of recording target tracks. The recording/reproducing apparatus includes a light irradiating/receiving unit that is configured to irradiate a plurality of recording light beams or reproducing light beams to be irradiated to the plurality of recording target tracks and a wobbling track light beam to be irradiated to the wobbling track to the optical recording medium through a common objective lens, at the time of recording or at the time of reproducing, and individually receive reflected light beams of the plurality of reproducing light beams and the wobbling track light beam from the optical recording medium.

The recording/reproducing apparatus further includes a gap length error signal generating unit that generates a gap length error signal representing an error of a gap length representing a distance between an objective surface of the objective lens and a recording surface of the optical recording medium based on a light receiving signal on the wobbling track light beam obtained by the light irradiating/receiving unit.

The recording/reproducing apparatus further includes a gap length control unit that controls the gap length based on the gap length error signal.

The recording/reproducing apparatus further includes a tracking servo control unit that generates a tracking error signal based on the light receiving signal on the wobbling track light beam, and displaces the objective lens in a tracking direction based on the tracking error signal.

The recording/reproducing apparatus further includes an address information detecting unit that detects address information recorded by modulation of a wobbling period of the wobbling track based on the light receiving signal on the wobbling track light beam.

The recording/reproducing apparatus further includes a clock generating unit that generates a clock which is synchronized with a forming period of the small record carrier based on the light receiving signal on the wobbling track light beam.

The recording/reproducing apparatus further includes a recording control unit that performs emission driving to emit the plurality of recording light beams at a timing according to the clock and executes recording on the plurality of recording target tracks.

The recording/reproducing apparatus further includes a binarization processing unit that binarizes each of recording signals of the plurality of recording target tracks based on a light receiving signal on each of the plurality of reproducing light beams obtained by the light irradiating/receiving unit and the clock.

Further, according to an embodiment of the present application, a recording/reproducing method is performed as follows.

That is, according to another embodiment of the present disclosure, there is provided a recording/reproducing method of performing recording/reproducing by a near field method on an optical recording medium that includes a recording target track that is a track on which small record carriers are arranged and on which information recording is performed by modulating the small record carriers through light irradiation, and a wobbling track on which the small record carriers are arranged in a wobbling manner, wherein a single wobbling track is formed to run parallel to a set of a plurality of recording target tracks. The recording/reproducing method includes generating a gap length error signal representing an error of a gap length representing a distance between an objective surface of the objective lens and a recording surface of the optical recording medium based on a light receiving signal on the wobbling track light beam obtained by a light irradiating/receiving unit that is configured to irradiate a plurality of recording light beams or reproducing light beams to be irradiated to the plurality of recording target tracks and a wobbling track light beam to be irradiated to the wobbling track to the optical recording medium through a common objective lens, at the time of recording or at the time of reproducing, and individually receive reflected light beams of the plurality of reproducing light beams and the wobbling track light beam from the optical recording medium.

The recording/reproducing method further includes controlling the gap length based on the gap length error signal.

The recording/reproducing method further includes generating a tracking error signal based on the light receiving signal on the wobbling track light beam, and displacing the objective lens in a tracking direction based on the tracking error signal.

The recording/reproducing method further includes detecting address information recorded by modulation of a wobbling period of the wobbling track based on the light receiving signal on the wobbling track light beam.

The recording/reproducing method further includes generating a clock which is synchronized with a forming period of the small record carrier based on the light receiving signal on the wobbling track light beam.

The recording/reproducing method further includes performing emission driving to emit the plurality of recording light beams at a timing according to the clock and executing recording on the plurality of recording target tracks.

The recording/reproducing method further includes binarizing each of recording signals of the plurality of recording target tracks based on a light receiving signal on each of the plurality of reproducing light beams obtained by the light irradiating/receiving unit and the clock.

Meanwhile, in order to perform recording/reproducing by the near field method on the optical recording medium serving as the pattern medium, at least the following operations need to be appropriately performed:

1) gap length servo
2) tracking servo or reproducing of address information
3) generation of clock (clock synchronized with a forming period of a small record carrier)

At this time, employing a technique of implementing the above 1), 2), and 3) using a track of a recording target (hereinafter referred to as a "recording track") as performed, for example, in a recordable optical disc recording medium of the related art can naturally be considered.

However, in the gap length servo in the near field method, servo control is performed using a quantity of reflected light from the optical recording medium as an evaluation index (a gap length error signal), such that the gap length error signal becomes constant. Thus, at this time, if a track of a recording target is the same as a servo track, when the gap length error signal is generated using reflected light of recording light at the time of recording, a quantity of reflected light increases, and thus only a gap length larger than at the time of reproducing can be held. In other words, it is difficult to maintain a proper gap length necessary for near field recording. Alternatively, auto gain control (AGC) may be applied to the gap length error signal at the time of recording. However, even when the AGC is applied, it is very difficult to secure stability of the gap length servo.

If the gap length servo is not appropriately implemented, it is difficult to perform tracking servo or address reproducing of the above 2), and it is difficult to appropriately obtain a signal necessary to generate a clock of the above 3).

In order to solve this problem and implement the appropriate gap length servo, employing a configuration in which dedicated light having a different wavelength from recording light is separately irradiated, and the gap length servo is performed using reflected light of the dedicated light can be considered. However, in this case, it is necessary to dispose a dichroic prism or the like to separate and detect reflected light of the recording light and reflected light of the dedicated light, and the configuration of the optical system becomes complicated, and the cost increases accordingly.

On the other hand, in the present embodiment, a wobbling track is formed to run in parallel separately from a track of a recording/reproducing target.

When the wobbling track is formed to run in parallel separately from the recording target track as described above, it is possible to generate the gap length error signal and perform the gap length servo by irradiating the wobbling track light to the wobbling track which is not used for recording separately from the recording light as in the recording/reproducing apparatus and the recording/reproducing method of the present application. As a result, the gap length error signal can be generated without being affected by the reflected light of the recording light at the time of recording, and it is possible to prevent the configuration of the optical system from becoming complicated and increasing in the cost since the dedicated light having a different wavelength from the recording light has to be irradiated and the reflected light of the dedicated light has to be separated and detected.

Further, when the wobbling track is formed to run in parallel separately from the recording target track as described above, it is possible to perform tracking servo or address reproducing of the above 2) and clock generation of the above 3) using the wobbling track which is not used for recording as in the recording/reproducing apparatus and the recording/reproducing method of the present application. Accordingly, an appropriate clock can be generated while preventing the PLL circuit for generating a clock from becoming complicated.

According to the embodiments of the present application described above, it is possible to provide a preferred structure of a pattern medium and a preferred recording/reproducing technique when recording/reproducing by the near field method is performed on the pattern medium.

Additional features and advantages are described herein, and will be apparent from the following Detailed Description and the figures.

BRIEF DESCRIPTION OF THE FIGURES

FIG. 5 is a diagram to describe a configuration of an objective lens according to the present embodiment;

FIG. 8 is a diagram to describe the structure of a laser diode array and the structure of a light receiving surface of a light receiving unit;

DETAILED DESCRIPTION

Figure 1:
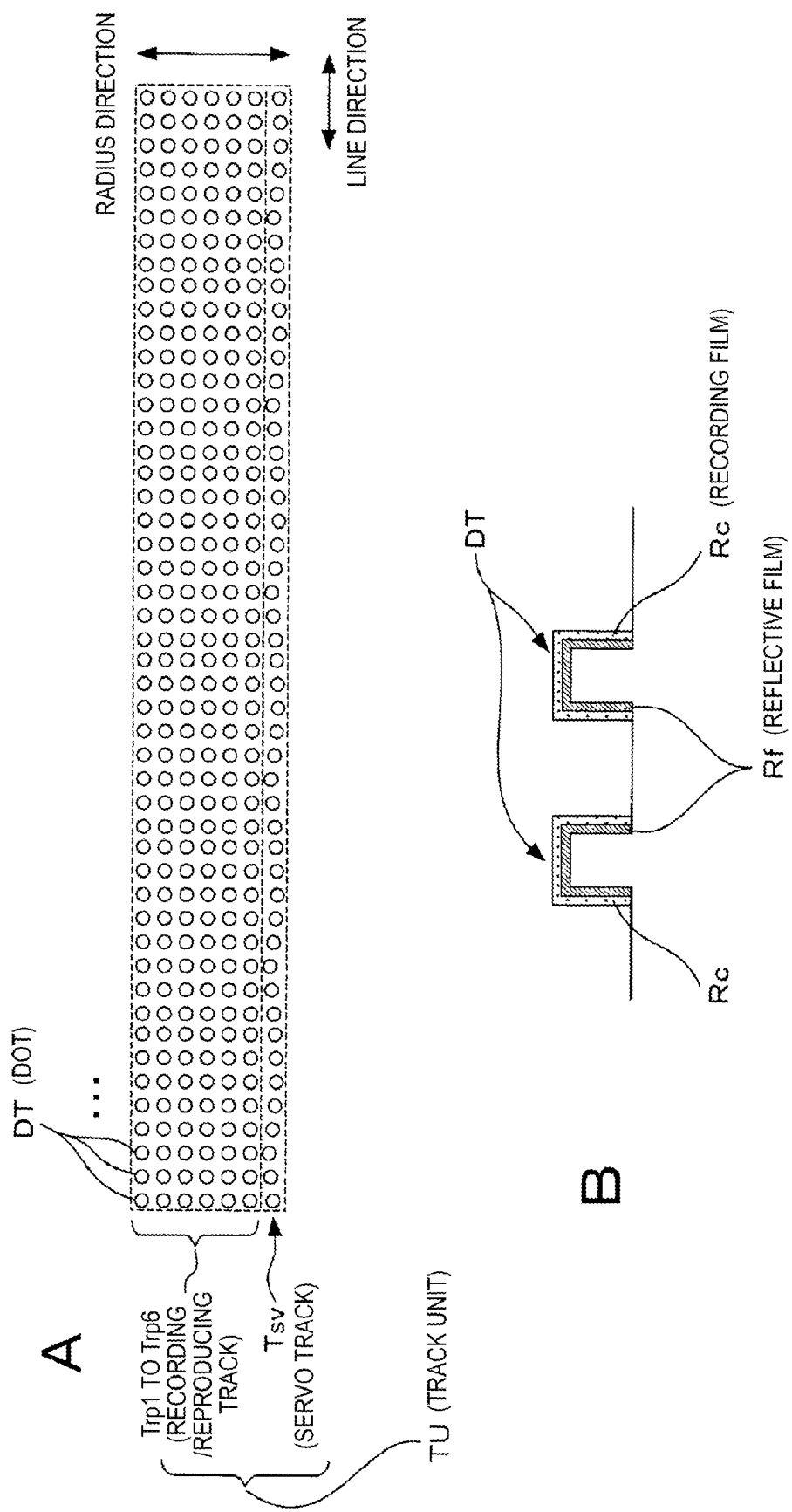
FIG. 1 is a diagram to describe the structure of a recording surface of an optical disc of the present application.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment of the present disclosure (hereinafter referred to as an "embodiment") will be described.

The description will proceed in the following order:

<1. Optical Recording Medium According to Embodiment>
<2. Recording/Reproducing Technique on Optical Recording Medium>
[2-1. Technique of Forming Small Optical Spot]
[2-2. Concrete Recording/Reproducing Technique]
<3. Recording/Reproducing Apparatus>
[3-1. Configuration of Optical Pickup]
[3-2. Internal Configuration of Whole Recording/Reproducing Apparatus]
[3-3. Example of Concrete Data Recording Format]
<4. Modified Embodiment>

<1. Optical Recording Medium According to Embodiment>

FIG. 1 is a diagram to describe the structure of a recording surface of an optical disc D as an embodiment of an optical recording medium of the present application. FIG. 1A is an enlarged plane view illustrating a part of the structure of the recording surface of the optical disc D, and FIG. 1B illustrates a cross-sectional structure of a part of the recording surface.

Figure 2:
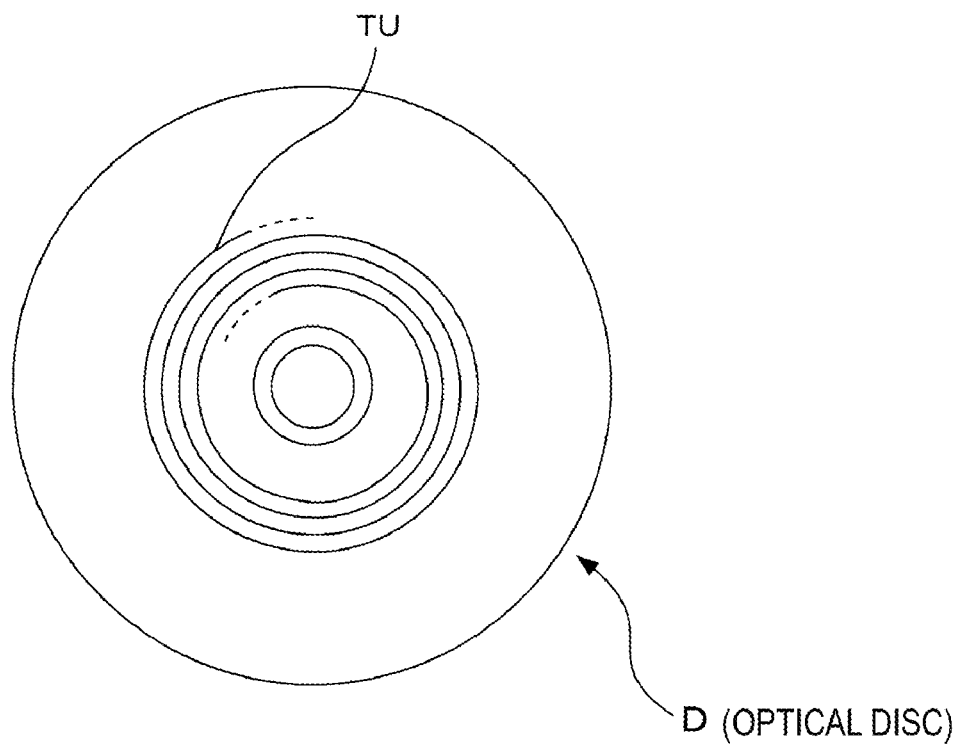
FIG. 2 is a plane view illustrating the entire structure of an optical recording medium of the present application.

FIG. 2 is a plane view illustrating the entire structure of the optical disc D.

As can be seen from FIG. 2, a disc-shaped optical recording medium is used as the optical disc D of this example. The optical recording medium refers to a recording medium in which recording of a signal or reproducing of recording information is performed by irradiation of light.

The optical disc D of this example has the structure of the pattern medium.

For example, the pattern medium refers to a recording medium in which a track on which a plurality of small record carriers by the size of about several tens of nanometers (nm) or less are arranged is formed, and recording information is expressed by a record/non-record (or erase) pattern of the small record carrier on the track.

The optical disc D of the present embodiment is an optical recording medium, and thus the small record carrier is configured to be modulated according to irradiation of light and hold a record state.

As can be seen from FIG. 1A, dots DT are very densely arranged as small record carriers on the recording surface of the optical disc D.

As can be seen from FIGS. 1A and 1B, the dots DT in this case have circular cylindrical shapes.

As illustrated in FIG. 1B, each of the dots DT is configured to include a reflective film Rf and a recording film Rc formed on the surface. Through this structure, the dots DT are subjected to modulation according to irradiation of light and hold a record state.

Preferably, the recording film Rc is configured with a recording film made of an inorganic material or an organic material used in a write-once type optical disc, a phase change material used in a rewritable type optical disc, or the like.

A set of a plurality of recording/reproducing tracks Trp and a single servo track Tsv are formed on the recording surface of the optical disc D as a track on which the dots DT serving as the small record carriers are arranged as illustrated in FIG. 1A.

The recording/reproducing track Trp is a track used for recording or reproducing, and is formed in the form of a straight line (it can be seen as a straight line in the enlarged view of FIG. 1B but has an arc shape when seen over the entire disc) as illustrated in FIG. 1B.

On the other hand, the servo track Tsv is used to detect tracking servo or address information which will be described later, and is a wobbling track as shown in FIG. 1. Specifically, the dots DT are arranged in a wobbling manner.

In the optical disc D of the present embodiment, the plurality of recording/reproducing tracks Trp and the single servo track Tsv are configured as a track unit TU. Specifically, in this example, the six recording/reproducing tracks Trp (Trp1 to Trp6) and the single servo track Tsv configure the track unit TU.

As illustrated in FIG. 2, in this case, the track unit TU in this case is formed in a spiral form in the recording surface of the optical disc D.

As described above, in the optical disc D of the present embodiment, the single servo track Tsv is formed to run in parallel to the plurality of recording/reproducing tracks Trp.

As can be seen from FIG. 1A, in the track unit TU, forming positions of the dots DT are aligned on each of the recording/reproducing tracks Trp and the servo track Tsv in a line direction (a direction orthogonal to a radial direction: a direction parallel to a progress direction of recording/reproducing).

Specifically, forming intervals of the dots DT on each of the recording/reproducing tracks Trp and the servo track Tsv in the line direction are the same, and the forming positions of the dots DT on the recording/reproducing tracks Trp and the servo track Tsv are aligned at the same positions in the line direction.

Since the forming positions of the dots DT in the line direction between tracks are aligned as described above, as will be described later, a clock generated using the servo track Tsv can be used to record/reproduce each recording/reproducing track Trp.

In this example, each of the dots DT is a convex cylinder (or a concave cylinder) of about 10 nm and has a diameter of about 11 nm. Further, a forming pitch (a pitch between the servo track Tsv and the adjacent track in the radial direction is a pitch based on a center line of the servo track Tsv) of the dots DT is about 22 nm in both of the line direction and the radial direction.

<2. Recording/Reproducing Technique on Optical Recording Medium>

[2-1. Technique of Forming Small Optical Spot]

As described above, in the optical disc D of the present embodiment, the dots DT are very densely arranged.

Figure 17:
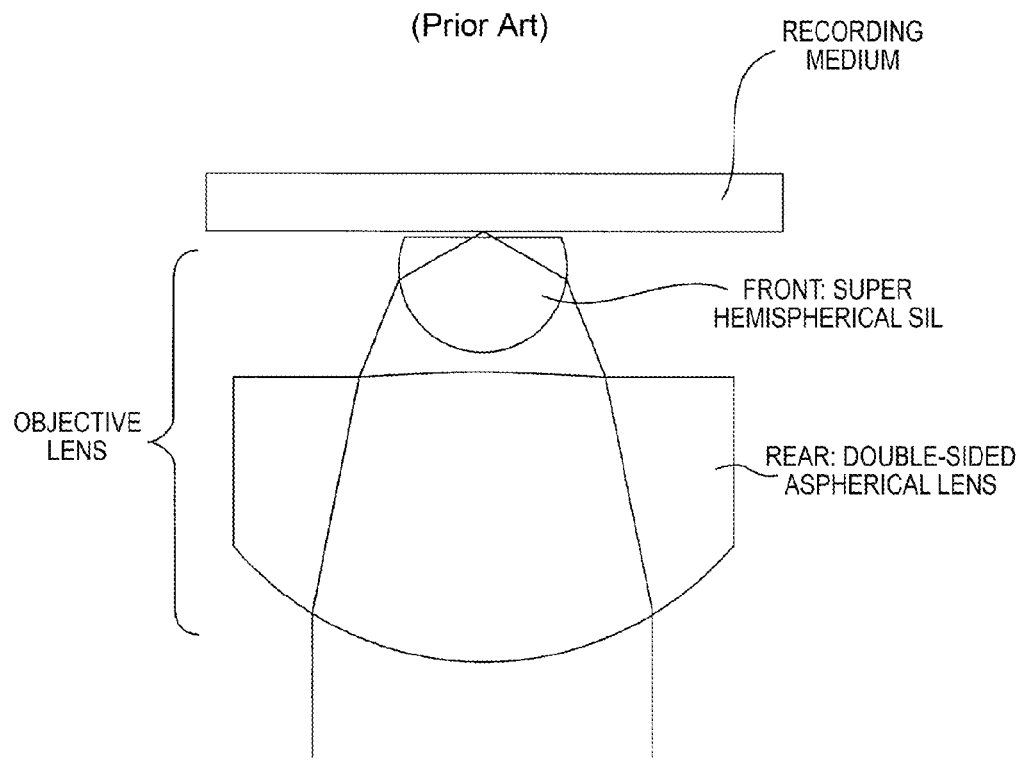
FIG. 17 is a diagram to describe a near field optical system using an SIL.

At this time, according to the diameter and the forming pitch described above, in the objective lens including the front lens by the super hemispherical SIL illustrated in FIG. 17, the spot diameter becomes too large, and it is very difficult to appropriately perform recording/reproducing for each of the dots DT. Specifically, it is very difficult to support the high-density pattern medium in which the spot diameter by the objective lens of the related art illustrated in FIG. 17 is about 220 nm, the diameter of each of the dots DT is about 11 nm, and the forming pitch of the dots DT is about 22 nm.

Thus, in the present embodiment, using an objective lens in which a hyper lens is embedded, it is possible to implement the spot diameter capable of supporting the optical disc D of this example.

Figure 3:
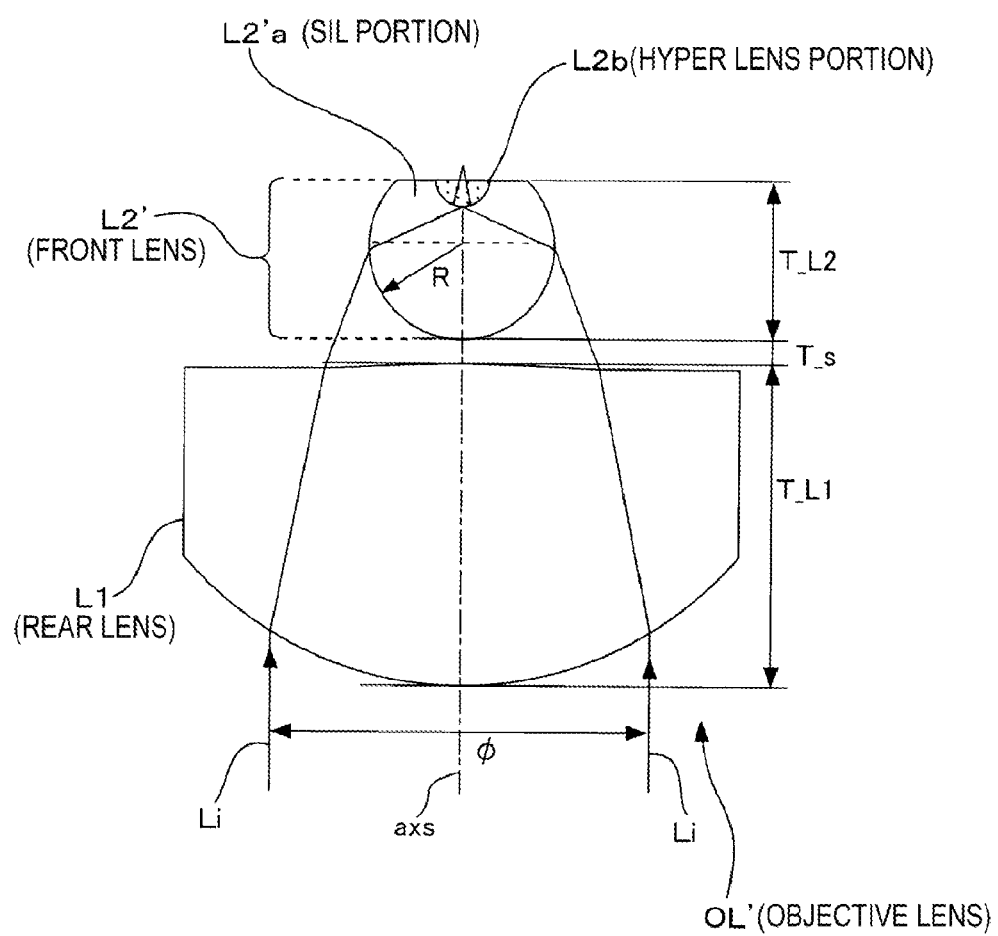
FIG. 3 is a diagram to describe a configuration of an objective lens in which a hyper lens is embedded.

FIG. 3 is a diagram to describe a configuration of an objective lens OL' in which a hyper lens is embedded.

FIG. 3 illustrates a cross section of the objective lens OL'.

In FIG. 3, an incident light L1 to the objective lens OL' and an optical axis axs are also illustrated.

As illustrated in FIG. 3, the objective lens OL' is a two-group lens including a rear lens L1 and a front lens L2'.

In this case, a double-sided aspherical lens is used as the rear lens L1.

The rear lens L1 causes convergent light based on the incident light L1 to be incident on the front lens L2'.

The front lens L2' described in FIG. 3 is a lens in which an SIL portion L2'a is integrated with a hyper lens portion L2b.

The SIL (the SIL portion L2'a) used in the front lens L2' is an SIL having a super hemispherical shape illustrated in FIG. 3. Specifically, illustrated is an example in which a super hemispherical SIL in which a surface of an object side is a plane surface is used as the SIL portion L2'a in this case.

For the sake of confirmation, the "object side" refers to a side on which an object which is a target of light irradiation by an objective lens is arranged. Since this case assumes application of the optical disc D to a recording/reproducing system, the object side refers to a side on which the optical disc D is arranged.

The SIL portion L2'a serving as a solid immersion lens is made of a high refractive index material in which a refractive index is at least larger than 1, and generates near-field light (evanescent light) by a numerical aperture of NA>1 based on incident light from the rear lens L1.

In the front lens L2', the hyper lens portion L2b is formed in the SIL portion L2'a facing an objective surface as illustrated in FIG. 3. Through this configuration, light by NA>1 generated by the SIL portion L2'a is incident on the hyper lens portion L2b.

As illustrated in FIG. 3, the hyper lens portion L2b has a substantially hemispherical shape as an overall shape.

Figure 4:
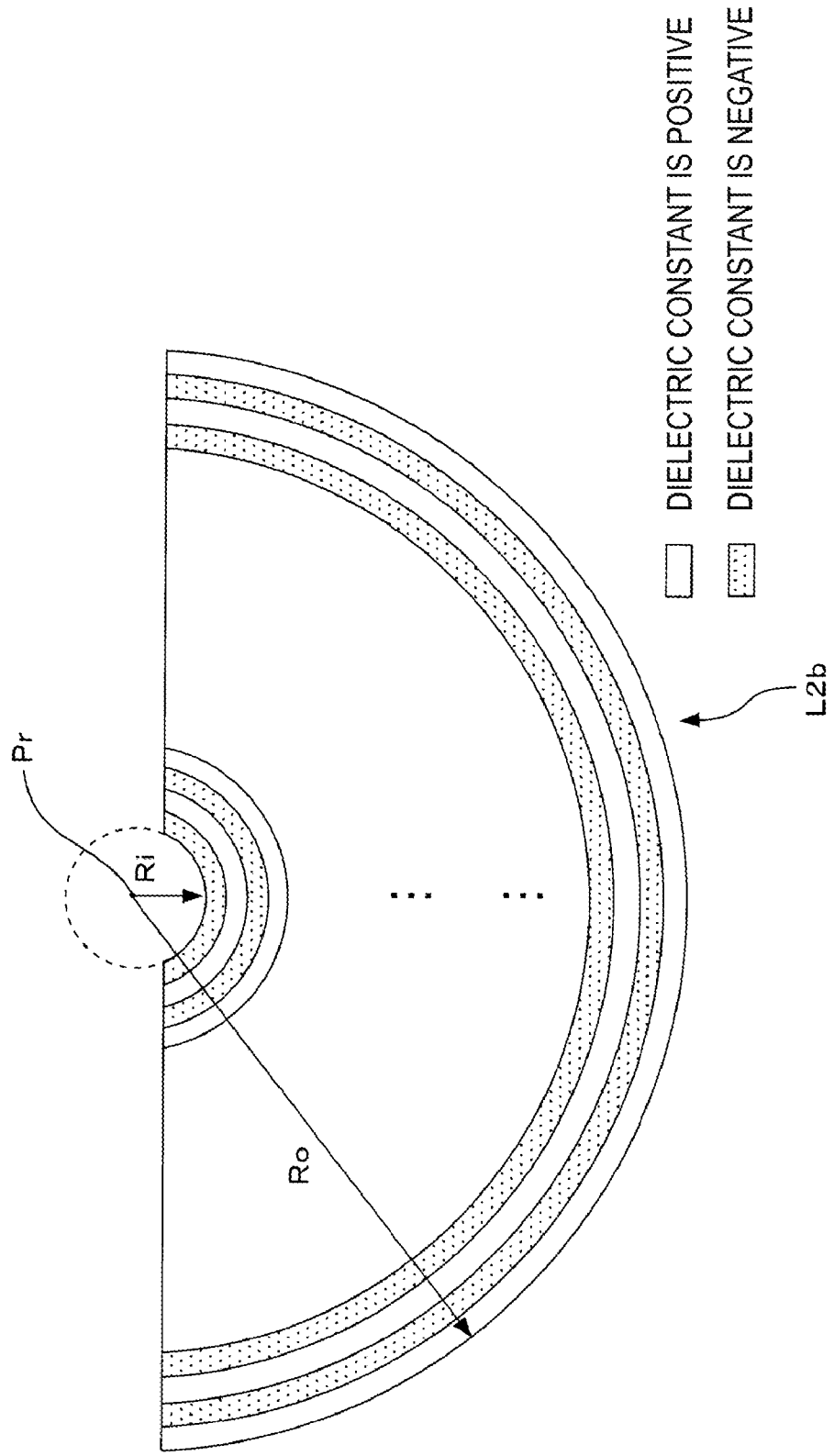
FIG. 4 is an enlarged cross-sectional view of a hyper lens portion.

FIG. 4 is an enlarged cross-sectional view of the hyper lens portion L2b.

As illustrated in FIG. 4, the hyper lens portion L2b has the structure in which a plurality of thin films are stacked.

Specifically, the hyper lens portion L2b is formed such that a first thin film whose dielectric constant ∈ is negative (∈<0) and a second thin film whose dielectric constant ∈ is positive (∈>0) are alternately stacked.

Here, a material having a negative dielectric constant ∈ is also called a plasmonic material. Examples of the plasmonic material include Ag, Cu, Au, and Al.

Further, examples of a material having a positive dielectric constant ∈ include a silicon-based compound such as $SiO_2$, SiN, or SiC, a fluoride such as $MgF_2$ or $CaF_2$, a nitride such as GaN or MN, a metal oxide, a glass, and a polymer.

Here, the dielectric constant ∈ changes depending on a wavelength λ of used light. Thus, it is desirable to select materials of the first thin film and the second thin film according to the wavelength λ so that a desired dielectric constant ∈ can be obtained.

In this example, it is assumed that Ag is selected as a material of the first thin film, and $Al_2O_3$ is selected as a material of the second thin film under the assumption that the wavelength λ is about 405 nm.

In FIG. 4, stacking the first thin film and the second thin film is performed, along a spherical surface by a radius Ri having a predetermined reference point Pr, which is set to the outside of the object side of the hyper lens portion L2b (which is the same as the outside of the object side of the front lens L2'), as the center, up to a range of a spherical surface by a radius Ro (Ro>Ri) having the reference point Pr as the center. At this time, since stacking the first thin film and the second thin film is performed with reference to the spherical surface, stacking of each thin film is performed in a dome form as illustrated in FIG. 4. As a result, the hyper lens portion L2b has an annual tree-ring shaped (a half annual tree-ring shaped) cross section as illustrated in FIG. 4.

For the sake of confirmation, the hyper lens portion L2b has a substantially semicircular shape as an overall shape as described above. Thus, a surface of the hyper lens portion L2b at the object side has a planar shape excluding a portion having the shape of a spherical surface by the radius Ri. The surface of the hyper lens portion L2b at the object side has the almost planar shape as described above because the surface of the hyper lens portion L2b at the object side should be formed to correspond to the surface shape of the SIL portion L2'a, at the object side, with which the hyper lens portion L2b is integrally formed, formed to have the planar shape.

Here, a total of the number of layers on which the first thin film and the second thin film are stacked is preferably in a range of 3 to 100,000. Specifically, in this example, a total of the number of layers on which the first thin film and the second thin film are stacked is about 68.

Preferably, each thin film has a film thickness of 4 nm to 40 nm, and in this example, the first and second thin films have film thicknesses of 10 nm.

As described above, the hyper lens portion L2b has the structure in which the first thin film having a negative dielectric constant and the second thin film having a positive dielectric constant are alternately stacked. Through this structure, the hyper lens portion L2b can propagate light (near-field light) of NA>1 in a direction parallel to a stacking direction of a thin film. In other words, light of NA>1 generated by the SIL portion L2'a can be propagated and then exit to the object side.

Further, according to the stacking structure of the hyper lens portion L2b described above, when light incident from the spherical surface side of the radius Ro exits from the spherical surface side of the radius Ri, flux of light (that is, the spot diameter of light) can be reduced by a degree corresponding to a ratio (Ro/Ri) of the radius Ro to the radius Ri.

Through this operation, the hyper lens portion L2b can be further reduce to a small optical spot realized by light of NA>1 generated by the SIL portion L2'a and propagate the light to be irradiated to the optical disc D.

As a result, according to the objective lens OL', recoding can be realized with a smaller spot diameter than the objective lens using the SIL of the related art.

Further, the hyper lens portion L2b having the structure illustrated in FIG. 4 can increase flux of return light from the object side by a degree corresponding to the ratio of the radius Ro to the radius Ri. In other words, the hyper lens portion L2b can reversibly reduce or increase flux of light.

The objective lens OL' including the hyper lens portion L2b capable of reversibly reducing/increasing flux of light can also perform reading on the dots DT on which recording has been performed using the objective lens OL'.

In other words, as a result, it is possible to implement both recording and reproducing using a common optical system, similarly to the optical disc system of the related art such as a CD, a DVD, and a BD. That is, it is unnecessary to employ a complicated configuration in which an optical system used for recording is different from an optical system used for reproducing.

Using the hyper lens portion L2b described above, the spot diameter can be reduced to up to about 30 nm. Specifically, for example, let us assume that the wavelength λ is 405 nm, Ro/Ri is 6.58, the thickness T_L1 (the length in a direction parallel to the optical axis axs) of the rear lens L1 illustrated in FIG. 3 is 1.7 mm, the thickness T_L2 of the SIL portion L2'a is 0.7124 mm, the radius R of the SIL portion L2'a is 0.45 mm, a space T_s between the rear lens L1 and the front lens L2'a (distance from a vertex of the object side surface of the rear lens L1 to a vertex of the super hemispherical surface of the SIL portion L2'a) is 0.1556 mm, and the diameter φ of the incident light L1 (parallel light) to the rear lens L1 is 2.1 mm.

In this case, the spot diameter of about 33 nm is realized.

Here, as will be described later, in the present embodiment, each track in the track unit TU is individually irradiated with light through the common objective lens.

For this reason, in the present embodiment, an objective lens OL in which a hyper lens array HLA in which a plurality of hyper lens portions L2b are arrayed is embedded as illustrated in FIG. 5 is used.

In FIG. 5, FIG. 5A is a cross-sectional view of the objective lens OL, and FIG. 5B is a plane view illustrating a form of an objective surface of a front lens L2 included in the objective lens OL.

As illustrated in FIG. 5, the objective lens OL of the present embodiment includes a rear lens L1 and a front lens L2 with which the hyper lens array HLA is integrally formed at the objective surface side thereof, similarly to the objective lens OL'.

In this case, in the front lens L2, an SIL portion excluding a portion in which the hyper lens array HLA is formed is referred to as an SIL portion L2a.

As can be seen from FIGS. 5A and 5B, the hyper lens array HLA includes a plurality of hyper lens portions L2b which are arranged in a direction parallel to the radial direction of the optical disc D.

Here, as will be described later, in the present embodiment, each track in the track unit TU is irradiated with one laser beam, and thus one laser diode and one hyper lens portion L2b are disposed for each track. Specifically, seven laser diodes LDrp1 to LDrp6 and LDsv and seven hyper lens portions L2b are disposed to support each of seven tracks configuring the track unit TU.

In the seven laser diodes, an emitting angle of each laser beam is adjusted so that each laser beam can be incident on one corresponding hyper lens portion L2b.

This point will be described again later with reference to FIG. 7.

At this time, a forming pitch of the hyper lens portions L2b in the hyper lens array HLA is set to the same pitch as the forming pitch (the pitch in the radial direction of the tracks in the track unit TU.

This allows each corresponding laser beam to be irradiated to each track.

[2-2. Concrete Recording/Reproducing Technique]

Figure 6:
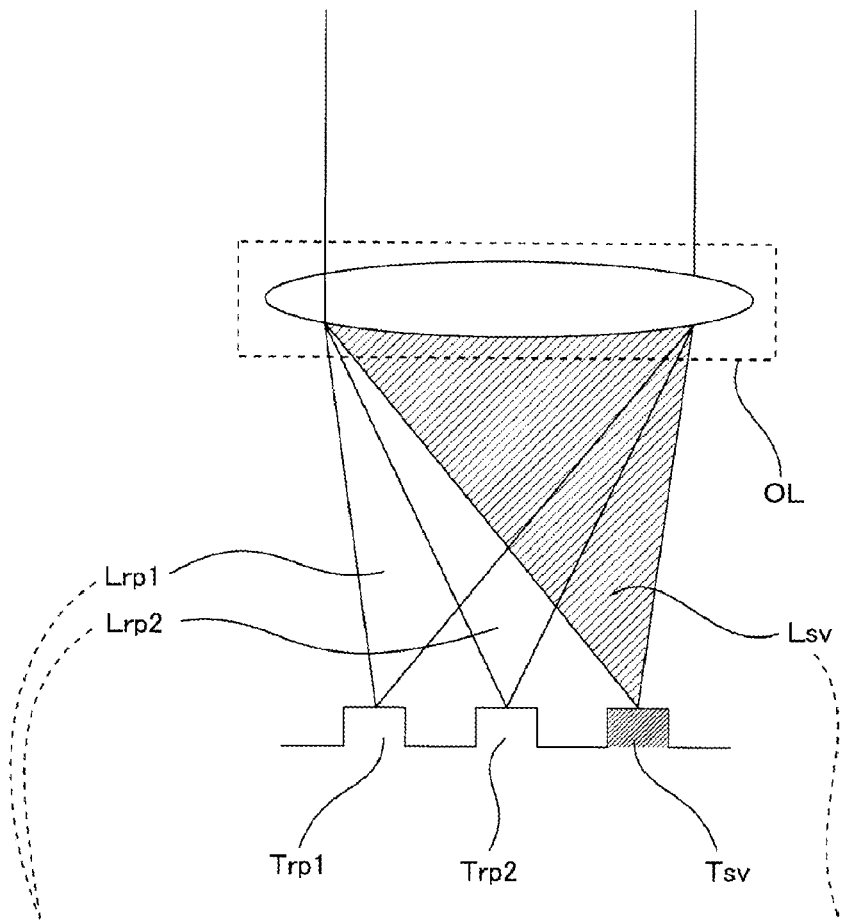
FIG. 6 is a diagram to describe a recording/reproducing technique according to an embodiment.

FIG. 6 is a diagram to describe a concrete recording/reproducing technique on the optical disc D.

As can be understood from the above description, in the optical disc D of the present embodiment, a total of seven tracks of six recording/reproducing tracks Trp (Trp1 to Trp6) and one servo track Tsv are formed in the track unit TU, and each of the seven tracks is individually irradiated with a laser beam. For simplified illustration, only the two recording/reproducing tracks Trp (Trp1 and Trp2) are illustrated in FIG. 6.

Here, a laser beam irradiated to the recording/reproducing track Trp is referred to as recording/reproducing light Lrp, and a laser beam irradiated to the servo track Tsv is referred to as servo light Lsv.

Individual laser beams irradiated to the recording/reproducing tracks Trp1 to Trp6 are referred to as the recording/reproducing lights Lrp1 to Lrp6, respectively.

First, as can be understood even from FIG. 5, in the present embodiment, both the recording/reproducing light Lrp irradiated to the recording/reproducing track Trp and the servo light Lsv irradiated to the servo track Tsv are irradiated to the optical disc D through the common objective lens OL. This enables tracking servo based on reflected light of the servo light Lsv which will be described later.

Under this assumption, in the present embodiment, gap length servo is performed based on the reflected light of the servo light Lsv.

Here, the gap length servo becomes a servo operation to maintain a gap (gap length) as a distance between the objective surface of the objective lens and the recording medium (recording surface) to a predetermined adjacent distance so that light (near-field light) of NA>1 in the near field method can be propagated (irradiated) to the recording medium. As described above, the gap length should be suppressed to be equal to or less than at least about a fourth (¼) a wavelength of light.

It can be evaluated whether or not the gap length is appropriate, that is, whether or not a near field bonding state has been appropriately obtained using a quantity of return light from the recording medium as an index. For this reason, in the present embodiment, the gap length servo is performed by adjusting the gap length using a light receiving signal level of the reflected light of the servo light Lsv as an evaluation index. Specifically, the gap length servo is performed such that an amplitude level of the light receiving signal is used as a gap length error signal, and the position of the objective lens OL in an optical axis direction is adjusted so that the amplitude level can be constant at a predetermined target value.

Further, in the present embodiment, the tracking servo is performed based on the reflected light of the servo light Lsv.

In the tracking servo, a tracking error signal TE representing a position error of an optical spot generated by irradiation of the servo light Lsv in a tracking direction with respect to the servo track Tsv is generated based on the reflected light of the servo light Lsv, and the position of the objective lens OL in the tracking direction is controlled based on the tracking error signal TE.

Through this operation, the optical spot of the servo light Lsv follows the servo track Tsv, and at the same time, each recording/reproducing light Lrp irradiated through the objective lens OL can be made to follow the corresponding recording/reproducing track Trp together with the servo light Lsv.

Further, in the present embodiment, address detection and relative speed detection are also performed based on the reflected light of the servo light. Here, the relative speed refers to the relative speed between the optical disc D and the optical spot of the laser beam irradiated through the objective lens OL.

The address detection and the relative speed detection are performed based on a result of detecting a wobbling frequency of the servo track Tsv. Specifically, the address detection is performed by demodulating an address information signal recorded by modulation of the wobbling frequency of the servo track Tsv. Further, the relative speed detection is performed by detecting a central frequency of the wobbling frequency of the servo track Tsv.

Further, in the present embodiment, a dot clock is generated based on the reflected light of the servo light Lsv. Here, the dot clock refers to a clock synchronized with a forming period of the dots DT arranged on the optical disc D. In the present embodiment, a dot clock Dclk representing the original forming period of the dots DT is generated.

For the sake of confirmation, when the optical disc D of the present embodiment has the structure illustrated in FIG. 1B, a reflectance difference is given by setting a height difference of about 10 nm between the dots DT and the other portion.

The dot clock Dclk can be generated using a change in the light receiving signal level corresponding to the reflectance difference.

Further, in the present embodiment, recording on the dots DT formed on the corresponding recording/reproducing track Trp or reproducing of a recording signal expressed by a record/non-record (or erase) pattern of the dots DT is performed by each recording/reproducing light Lrp irradiated to each recording/reproducing track Trp.

Specifically, recording by the recording/reproducing light Lrp is performed using the dot clock Dclk as a recording clock. In other words, recording is performed by causing the recording/reproducing light Lrp to emit light at recording power according to a timing represented by the dot clock Dclk.

Further, reproducing is performed by sampling a read signal based on the reflected light of the recording/reproducing light Lrp at a timing represented by the dot clock Dclk.

Here, as described with reference to FIG. 1, in the track unit TU, the forming positions of the dots DT in the line direction are aligned between tracks. For this reason, even though the track unit TU of the servo track Tsv is used for recording/reproducing of the recording/reproducing track Trp as described above, recording on the dots DT in each recording/reproducing track Trp or determination (determination of "0" or "1", that is, a binarization process) of recording/non-recording (or erasing) of the dots DT can be appropriately performed.

Meanwhile, in order to perform recording/reproducing by the near field method on the optical recording medium serving as the pattern medium, at least the following operations should be appropriately performed:

1) gap length servo;
2) tracking servo or reproducing of address information
3) generation of a dot clock Regarding the above 1), in the gap length servo in the near field method, servo control is performed using a quantity of return light from the optical recording medium as an evaluation index (the gap length error signal) as described above. However, if a track of a recording target is the same as a track for gap length servo, generating the gap length error signal using reflected light of recording light at the time of recording can naturally be considered. However, since, in the gap length servo, servo control is performed such that a quantity of reflected light from the optical recording medium becomes constant as described above, as a quantity of reflected light increases at the time of recording, only a gap length larger than at the time of reproducing can be held. In other words, it is difficult to maintain a proper gap length necessary for near field recording. Alternatively, auto gain control may be applied to the gap length error signal at the time of recording. However, in this case, servo easily deviates due to a spike noise at the time of power transition of a recording section and a non-recording section, and thus it is very difficult to stably perform the gap length servo.

If the gap length servo of the above 1) is not implemented, it is difficult to perform tracking servo or address reproducing of the above 2), and it is difficult to appropriately obtain a signal necessary to generate a dot clock of the above 3).

In this regard, in order to implement the appropriate gap length servo, employing a configuration in which dedicated light having a different wavelength from recording light is separately irradiated, and the gap length servo is performed using reflected light of the dedicated light can be considered.

However, in this case, it is necessary to dispose a dichroic prism or the like to separate and detect reflected light of the recording light and reflected light of the dedicated light, and the configuration of the optical system becomes complicated, and the cost increases accordingly.

On the other hand, in the present embodiment, a wobbling track (Tsv) is formed to run in parallel separately from a track (Trp) of a recording/reproducing target.

When the wobbling track is formed to run in parallel separately from the track of the recording/reproducing target as described above, it is possible to generate the gap length error signal and perform the gap length servo by the separate servo light Lsv from the recording/reproducing light Lip using the wobbling track which is not used for recording as in the above-described recording/reproducing technique.

As a result, the gap length error signal can be generated without being affected by the reflected light of the recording/reproducing light Lrp at the time of recording, and it is possible to prevent the configuration of the optical system from becoming complicated and increasing in the cost since the dedicated light having a different wavelength from the recording light should be irradiated and the reflected light of the dedicated light should be separated and detected.

Further, since the wobbling track (Tsv) is formed to run in parallel separately from the track (Trp) of the recording/reproducing target as described above, it is possible to perform tracking servo or address reproducing of the above 2) and dot clock generation of the above 3) using the wobbling track which is not used for recording as in the above described recording/reproducing technique.

Here, regarding generation of the dot clock of 3), in the pattern medium of the related art, based on a relation in which a sector servo system (a sample servo system) disclosed in Japanese Patent Application Laid-Open No. 2010-27169 is used, a recording pattern for dot clock generation (a servo pattern area (S)) is inserted between data recording areas (data recording areas D) which are a data recording/reproducing target, and a dot clock is generated based on the recording pattern for clock generation. Specifically, a phase of a dot clock generated from the recording pattern for clock generation is held, and recording/reproducing is performed on the data recording area according to the clock whose phase is held. For this reason, in the related art, a previous value hold type numerical controlled oscillator (NCO) is necessary as a phase-locked loop (PLL) circuit for generating a dot clock, and a configuration of the PLL circuit becomes complicated accordingly.

On the other hand, when the servo track Tsv is formed separately from the recording/reproducing track Trp which is the recording/reproducing target and generation of a dot clock is performed using the servo track Tsv as in the present embodiment, the dot clock can be continuously generated from the servo track Tsv even during recording or reproducing, and thus it is unnecessary to dispose the previous value hold type NCO used in the pattern medium of the related art. Accordingly, an appropriate dot clock can be generated while preventing the PLL circuit from becoming complicated.

As described above, according to the present application, when recording/reproducing by the near field method is performed on the pattern medium, the appropriate structure of the pattern medium and the preferred recording/reproducing technique can be provided.

<3. Recording/Reproducing Apparatus>

[3-1. Configuration of Optical Pickup]

Figure 7:
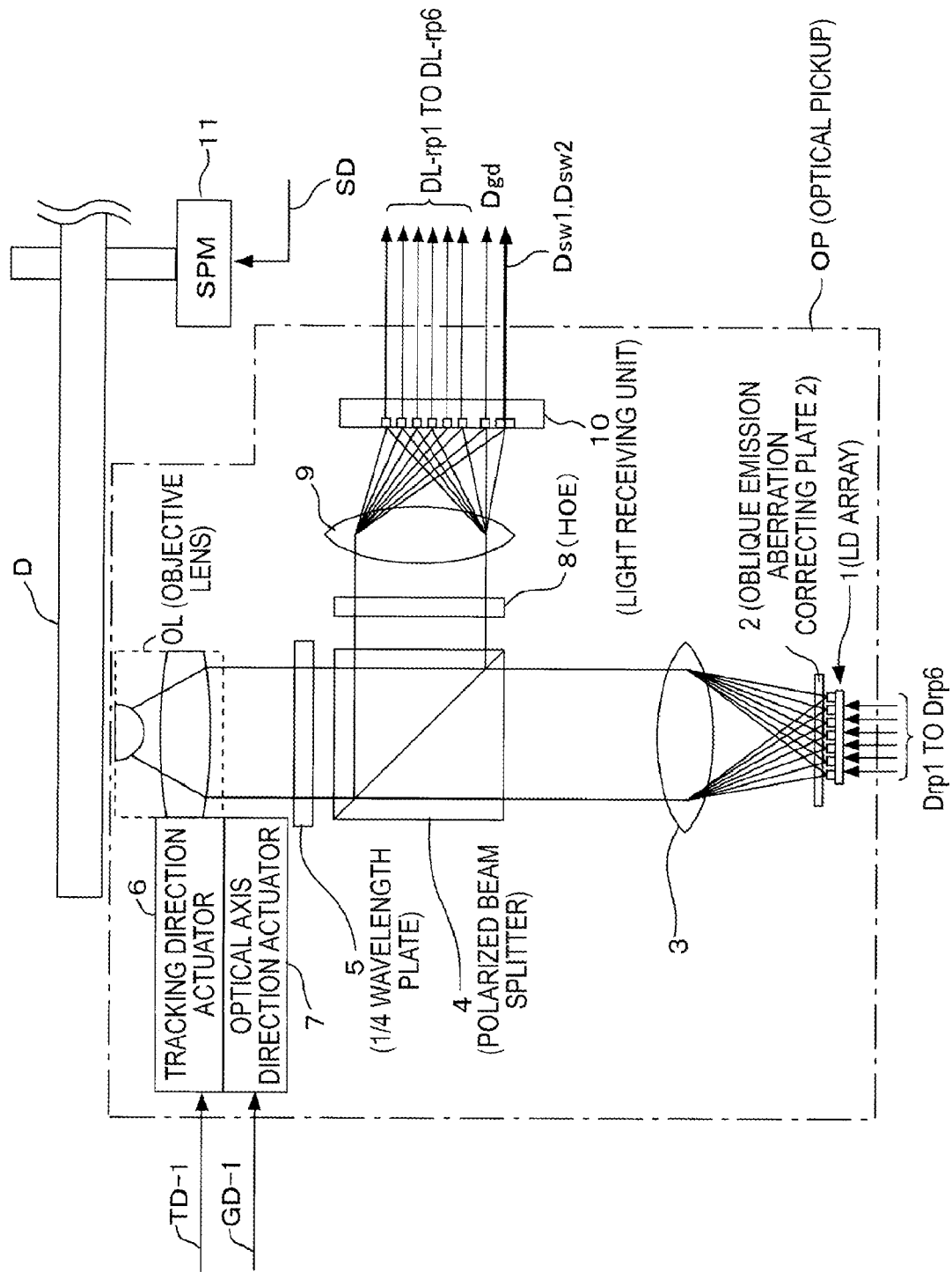
FIG. 7 is a diagram illustrating an internal configuration of an optical pickup of a recording/reproducing apparatus according to an embodiment.

FIG. 7 is a diagram illustrating an internal configuration of an optical pickup (an optical pickup OP) of a recording/reproducing apparatus as an embodiment to implement the above-described recording/reproducing technique.

Referring to FIG. 7, the optical disc D is first rotationally driven by a spindle motor (SPM) 11. Light irradiation to record information or reproduce recording information by the optical pickup OP is performed on the optical disc D rotationally driven by the spindle motor 11.

A laser diode array (hereinafter referred to as an "LD array") 1 in which a plurality of laser diodes LD that individually irradiate laser beams to the recording/reproducing tracks Trp1 to Trp6 and the servo track Tsv formed on the optical disc D are arranged is disposed in the optical pickup OP.

FIG. 8A is a plane view of the LD array 1.

As illustrated in FIG. 8A, the LD array 1 is formed such that a total of six recording/reproducing laser diodes LDrp of recording/reproducing laser diodes LDrp1 to LDrp6 and the servo laser diode LDsv are arranged.

The recording/reproducing laser diode LDrp1 is a laser diode that emits the recording/reproducing light Lrp1 to be irradiated to the recording/reproducing track Trp1. Similarly, the recording/reproducing laser diodes LDrp2 to LDrp6 are laser diodes that emit the recording/reproducing lights Lrp2 to Lrp6 to be irradiated to the recording/reproducing tracks Trp2 to Trp6, respectively.

Further, the servo laser diode LDsv is a laser diode that emits the servo light Lsv to be irradiated to the servo track Tsv.

The description will now return to FIG. 7.

The laser beams (the recording/reproducing lights Lrp1 to Lrp6 and the servo light Lsv) emitted from the laser diodes LD of the LD array 1 are incident on an oblique emission aberration correcting plate 2 in a state of diverging light as illustrated in FIG. 7. The oblique emission aberration correcting plate 2 performs aberration correction on obliquely emitted laser beams.

Here, as described above, in the present embodiment, by adjusting an emission angle of a laser beam emitted from each laser diode LD of the LD array 1, each laser beam is incident on one corresponding hyper lens portion L2b in the objective lens OL.

Specifically, the recording/reproducing laser diode LDrp4 arranged at the center emits a laser beam without inclining the optical axis, and so the corresponding laser beam is incident on the hyper lens portion L2b (arranged at the center of the hyper lens array HPA) corresponding to the recording/reproducing track Trp4. The laser diodes LD excluding the recording/reproducing laser diode LDrp4 are inclined at corresponding angles and then emit laser beams. As a result, the recording/reproducing light Lrp1 is incident on the hyper lens portion L2b corresponding to the recording/reproducing track Trp1, the recording/reproducing light Lrp2 is incident on the hyper lens portion L2b corresponding to the recording/reproducing track Trp2, the recording/reproducing light Lrp3 is incident on the hyper lens portion L2b corresponding to the recording/reproducing track Trp3, the recording/reproducing light Lrp5 is incident on the hyper lens portion L2b corresponding to the recording/reproducing track Trp5, the recording/reproducing light Lrp6 is incident on the hyper lens portion L2b corresponding to the recording/reproducing track Trp6, and the servo light Lsv is incident on the hyper lens portion L2b corresponding to the servo track Tsv.

Each laser beam that has passed through the oblique emission aberration correcting plate 2 is converted into parallel light through the collimation lens 3, and is then incident on the polarized beam splitter 4. The polarized beam splitter 4 is configured to allow each laser beam incident from a light source side to pass through.

Each laser beam that has passed through the polarized beam splitter 4 passes through a ¼-wavelength plate 5, and then is incident on the optical disc D through the objective lens OL. In other words, each laser beam is incident on each corresponding track T through each corresponding hyper lens portion L2b.

Here, for the objective lens OL, a tracking direction actuator 6 that displaces the objective lens OL in the tracking direction (a direction parallel to a radial direction of the optical disc D) and an optical axis direction actuator 7 that displaces the objective lens OL in an optical axis direction (which is referred to as a focus direction or a gap servo direction) are disposed.

In this example, a piezo actuator is used as both the tracking direction actuator 6 and the optical axis direction actuator 7.

In this case, the objective lens OL is held by the tracking direction actuator 6, the tracking direction actuator 6 that holds the objective lens OL is held by the optical axis direction actuator 7. Thus, by driving the tracking direction actuator 6 and the optical axis direction actuator 7, the objective lens OL can be displaced in the tracking direction and the optical axis direction.

Even when the optical axis direction actuator 7 holds the objective lens OL and the tracking direction actuator 6 holds the optical axis direction actuator 7, the same effect can be obtained.

Figure 9:
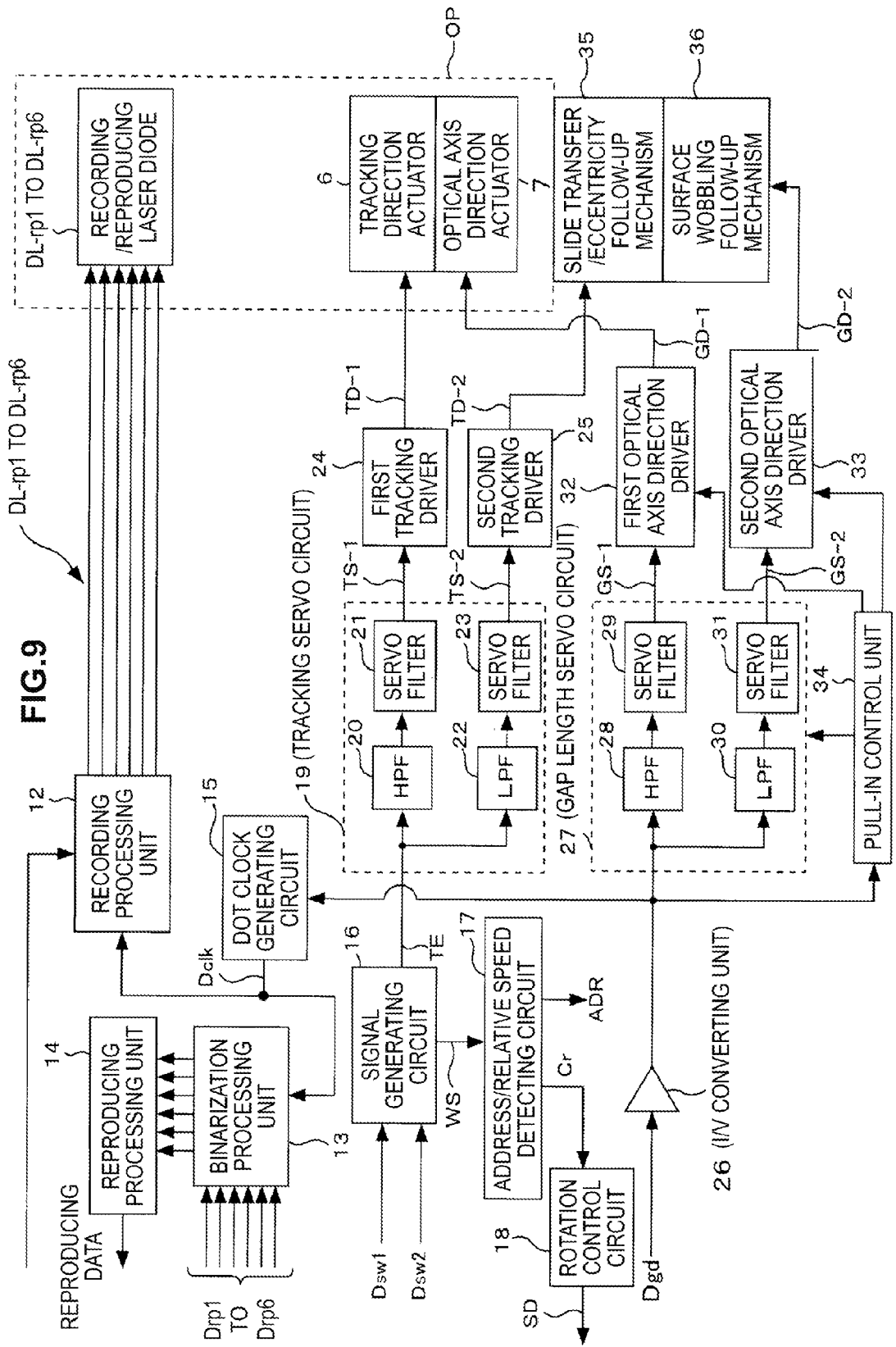
FIG. 9 is an overall internal configuration of a recording/reproducing apparatus according to an embodiment.

The tracking direction actuator 6 is driven based on a first tracking drive signal TD-1 from a first tracking driver 24 illustrated in FIG. 9.

Further, the optical axis direction actuator 7 is driven based on a first optical axis direction drive signal GD-1 from a first optical axis direction driver 32 illustrated in FIG. 9.

Here, when each laser beam is irradiated to each corresponding track T of the optical disc D at the time of reproducing, reflected light of each laser beam is obtained. The reflected light of each laser beam obtained as described above is output from a surface of the objective lens OL at a side opposite to the objective surface through each corresponding hyper lens portion L2b.

The reflected light of each laser beam output from the objective lens OL passes through the ¼-wavelength plate 5 and then is incident on the polarized beam splitter 4.

Here, each reflected light (return path light) incident on the polarized beam splitter 4 has a polarizing direction which differs by 90 degrees from each laser beam (outward light) incident from the light source on the polarized beam splitter 4 due to an operation by the ¼-wavelength plate 5 and an operation of the optical disc D at the time of reflection. As a result, each reflected light incident as described above is reflected against the polarized beam splitter 4.

Each reflected light reflected against the polarized beam splitter 4 passes through a holographic optical element (HOE) 8 and then is focused on a light receiving surface of a light receiving unit 10 through a condensing lens 9.

At this time, among the reflected lights, the reflected light of the servo light Lsv is split into two directions by the HOE 8. Thus, the reflected light of the servo light Lsv is focused at two different positions on the light receiving unit 10 through the condensing lens 9.

FIG. 8B illustrates the structure of a light receiving surface of the light receiving unit 10.

As illustrated in 8B, recording/reproducing photodetectors DTrp1 to DTrp6, the gap length servo/dot clock generation photodetector DTgd, and the servo/wobble detection photodetector DTsw are formed on a light receiving surface of the light receiving unit 10.

The recording/reproducing photodetectors DTrp1 to DTrp6 are disposed to receive corresponding reflected light among reflected lights of the recording/reproducing lights Lrp1 to Lrp6 condensed by the condensing lens 9. Specifically, the detector DTrp1, the detector DTrp2, the detector DTrp3, the detector DTrp4, the detector DTrp5, and the detector DTrp6 are formed on the light receiving unit 10 to receive the recording/reproducing light Lrp1, the recording/reproducing light Lrp2, the recording/reproducing light Lrp3, the recording/reproducing light Lrp4, the recording/reproducing light Lrp5, and the recording/reproducing light Lrp6, respectively.

Further, the gap length servo/dot clock generation photodetector DTgd is formed to receive one of reflected lights by splitting the reflected light of the servo light Lsv into two directions by the HOE 8.

Further, in this example, a two-division detector is used as the servo/wobble detection photodetector DTsw. Division of the servo/wobble detection photodetector DTsw is performed such that two light receiving areas are arranged adjacent to each other in the tracking direction.

The servo/wobble detection photodetector DTsw is formed to receive the other of the reflected lights by splitting the reflected light of the servo light Lsv into two directions by the HOE 8.

Here, the light receiving signal by the recording/reproducing photodetector DTrp1 is referred to as a light receiving signal Drp1. Similarly, light receiving signals by the recording/reproducing photodetector DTrp2, the recording/reproducing photodetector DTrp3, the recording/reproducing photodetector DTrp4, the recording/reproducing photodetector DTrp5, and the recording/reproducing photodetector DTrp6 are referred to as light receiving signals Drp2, Drp3, Drp4, Drp5, and Drp6, respectively.

Further, a light receiving signal by the gap length servo/dot clock generation photodetector DTgd is referred to as a light receiving signal Dgd. A light receiving signal obtained by one light receiving area of the servo/wobble detection photodetector DTsw is referred to as a light receiving signal Dsw1, and a light receiving signal obtained by the other light receiving area is referred to as a light receiving signal Dsw2.

[3-2. Internal Configuration of Whole Recording/Reproducing Apparatus]

FIG. 9 illustrates an overall internal configuration of a recording/reproducing apparatus according to an embodiment.

Among the components of the internal configuration of the optical pickup OP illustrated in FIG. 7, the recording/reproducing laser diodes LDrp1 to LDrp6, the tracking direction actuator 6, and the optical axis direction actuator 7 are selectively illustrated in FIG. 9.

The spindle motor 11 is not illustrated in FIG. 9.

First, as a configuration for implementing the gap length servo, a recording/reproducing apparatus includes an I/V converting unit 26, a gap length servo circuit 27, a first optical axis direction driver 32, a second optical axis direction driver 33, a pull-in control unit 34, and a surface wobbling follow-up mechanism 36.

First, the surface wobbling follow-up mechanism 36 holds a slide transfer/eccentricity follow-up mechanism 35, which holds the optical pickup OP, to be displaced in the optical axis direction (the focus direction).

In this example, the surface wobbling follow-up mechanism 36 is equipped with a linear motor and has relatively rapid responsiveness. The surface wobbling follow-up mechanism 36 drives the linear motor to drive the slide transfer/eccentricity follow-up mechanism 35 in the optical axis direction, and so the optical pickup OP is displaced in the optical axis direction.

Even if a positional relation between the surface wobbling follow-up mechanism 36 and the slide transfer/eccentricity follow-up mechanism 35 is changed, the same effect is obtained, similarly to the relation between the tracking direction actuator 6 and the optical axis direction actuator 7.

The light receiving signal Dgd which has been subjected to I/V conversion by the UV converting unit 26 functions as an error signal in the gap length servo.

Figure 10:
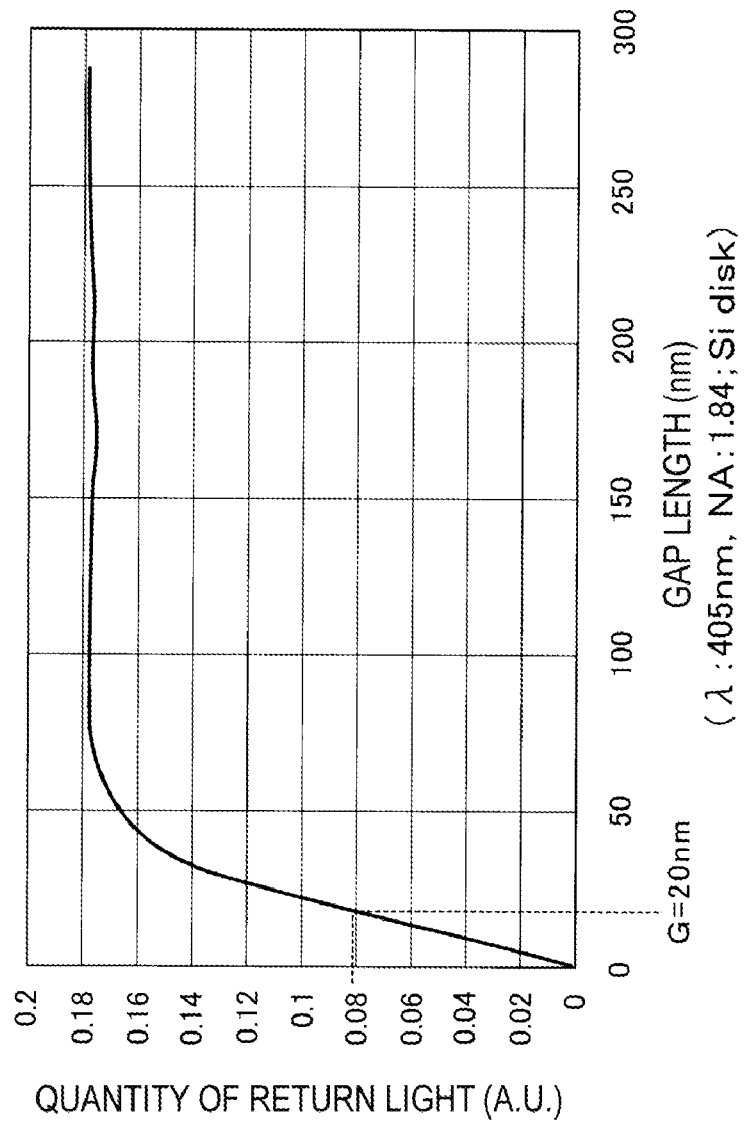
FIG. 10 is a diagram to describe a relation between a gap length and a quantity of return light from an objective lens.

Here, FIG. 10 is a diagram to describe a relation between the gap length and a quantity of return light from the objective lens OL (a quantity of return light from an end surface of the hyper lens portion L2b at the object side).

FIG. 10 illustrates a relation between the gap length and a quantity of return light when a silicon (Si) disc is used as an example. However, even when the recording film Rc made of a phase change material or the like is used as in the present example, almost the same relation as in FIG. 10 is obtained.

Further, in order to obtain the result illustrated in FIG. 10, the wavelength λ of the servo light Lsv was set to 405 nm, and the effective numerical aperture NA of the objective lens OL was set to 1.84.

As illustrated in FIG. 10, a quantity of return light from the objective lens OL becomes maximum in an area in which the gap length is very large and near field bonding does not occur. This is because when near field bonding does not occur, irradiation light is fully reflected against an end surface of the objective lens OL (an end surface of the hyper lens portion L2b).

On the other hand, in an area in which the gap length is equal to or less than 50 nm, which is about a fourth (¼) the wavelength, as the gap length decreases, the quantity of return light gradually decreases due to an operation of the near field bonding.

Here, when a priority is given to an operation by near field bonding, the shorter the gap length is, the better. However, when the gap length is reduced, a collision or friction between the objective lens OL and the optical disc D becomes problematic. For this reason, the gap length is set to maintain a gap with the optical disc D to some extent within a range in which near field bonding occurs.

From this point of view, in the present example, the gap length G (gap G) is set to about 20 nm.

In FIG. 10, for example, a target value of a quantity of return light when the gap G is set to 20 nm is about 0.08.

In order to perform the gap length servo, a target value of a quantity of return light is calculated based on a value of the gap G in advance. The gap length servo is performed when a detected quantity of return light becomes constant at a target value which is previously obtained as described above.

The description will now return to FIG. 9.

The light receiving signal Dgd that has passed through the I/V converting unit 26 is supplied to a dot clock generating circuit 15 which will be described later, and supplied to the gap length servo circuit 27 and the pull-in control unit 34 as illustrated in FIG. 9.

The gap length servo circuit 27 includes a first gap length servo signal generating system configured with a high pass filter (HPF) 28 and a servo filter 29 and a second gap length servo signal generating system configured with a low pass filter (LPF) 30 and a servo filter 31.

The first gap length servo signal generating system corresponds to the optical axis direction actuator 7, and the second gap length servo signal generating system corresponds to the surface wobbling follow-up mechanism 36.

The HPF 28 receives the light receiving signal Dgd that has passed through the I/V converting unit 26, extracts a component equal to or more than a predetermined cutoff frequency from the light receiving signal Dgd, and outputs the extracted component to the servo filter 29.

The servo filter 29 calculates a servo calculation based on the output signal of the HPF 28, and generates a first gap length servo signal GS-1.

Further, the LPF 30 receives the light receiving signal Dgd that has passed through the I/V converting unit 26, extracts a component equal to or less than a predetermined cutoff frequency from the light receiving signal Dgd, and outputs the extracted component to the servo filter 31.

The servo filter 31 calculates a servo calculation based on the output signal of the LPF 30, and generates a second gap length servo signal GS-2.

Here, a target value (that is, an amplitude value of the light receiving signal Dgd at the gap G) on the quantity of return light previously obtained based on the gap G remains set to the gap length servo circuit 27, and the servo filters 29 and 31 generate the first and second gap length servo signals GS-1 and GS-2 to cause the amplitude value of the light receiving signal Dgd to become the corresponding target value.

The first optical axis direction driver 32 drives the optical axis direction actuator 7 by a first optical axis direction drive signal GD-1 generated based on the first gap length servo signal GS-1.

Further, the second optical axis direction driver 33 drives the surface wobbling follow-up mechanism 36 by a second optical axis direction drive signal GD-2 generated based on the second gap length servo signal GS-2.

Here, in the above-described gap length servo circuit 27, the cutoff frequency of the LPF 30 is set to a frequency equal to or more than a surface wobbling period of a disc. This allows the surface wobbling follow-up mechanism 36 to displace the optical pickup OP to follow disc surface wobbling.

As described above, the whole optical pickup OP is driven to follow the surface wobbling, and it is possible to prevent the objective lens OL from colliding with the optical disc D.

The pull-in control unit 34 is disposed to perform pull-in control of the gap length servo.

A target value (that is, an amplitude value of the light receiving signal Dgd at the gap G) on the quantity of return light previously obtained based on the gap G remains set to the pull-in control unit 34. The pull-in control unit 34 performs the pull-in control of the gap length servo based on the set target value as follows.

First, when the gap length servo is in an off state, a difference between the amplitude value of the light receiving signal Dgd input through the I/V converting unit 26 and the target value is calculated. Then, it is determined whether or not the difference value is in a pull-in range which is previously set. When the difference value is not in the pull-in range, a pull-in waveform (a signal to change the amplitude value of the light receiving signal Dgd in a direction to reduce the difference) corresponding to the difference is generated, and the pull-in waveform is applied to the first optical axis direction driver 32 and the second optical axis direction driver 33. This allows control to be performed such that the amplitude value of the light receiving signal Dgd falls within the pull-in range.

Then, when the difference value is in the pull-in range, an instruction to turn on a servo loop (both of the first and second gap length servo signal generating systems) is given to the gap length servo circuit 27. This completes the pull-in control.

Further, the recording/reproducing apparatus of the present embodiment has a configuration to perform tracking servo, address detection, and relative speed detection based on the light receiving signals Dsw1 and Dsw2 obtained by the servo/wobble detection photodetector DTsw.

Specifically, this configuration includes a signal generating circuit 16, an address/relative speed detecting circuit 17, a tracking servo circuit 19, a first tracking driver 24, a second tracking driver 25, and a slide transfer/eccentricity follow-up mechanism 35.

The signal generating circuit 16 generates the tracking error signal TE and a wobbling signal WS (a signal related to wobbling of the servo track Tsv) based on the light receiving signals Dsw1 and Dsw2.

As illustrated in FIG. 9, the tracking error signal TE is supplied to the tracking servo circuit 19, and the wobbling signal WS is supplied to the address/relative speed detecting circuit 17.

Here, in the recording/reproducing apparatus, the tracking servo circuit 19, the first tracking driver 24, the second tracking driver 25, and the slide transfer/eccentricity follow-up mechanism 35 are disposed to implement tracking servo on the servo light Lsv and the recording/reproducing light Lip described above and slide servo on the entire optical pickup OP.

The slide transfer/eccentricity follow-up mechanism 35 holds the optical pickup OP to be displaceable in the tracking direction.

For example, the slide transfer/eccentricity follow-up mechanism 35 is configured to include a power unit having a responsiveness faster than that of a motor included in a thread mechanism installed in an optical disc system of the related art such as a CD or a DVD, and displaces the optical pickup OP not only to perform the slide transfer during seeking but also to suppress lens shift occurring due to the disc eccentricity when the tracking servo is in an on state.

In the present example, the slide transfer/eccentricity follow-up mechanism 35 includes a linear motor, and is configured to apply driving force generated by the linear motor to a mechanism unit that holds the optical pickup OP to be displaceable in the tracking direction.

Here, in the recording/reproducing apparatus of the present embodiment, the entire optical pickup OP is driven to follow even disc eccentricity because a system using the objective lens OL including the hyper lens portion L2b as in the present embodiment is considered to be relatively narrower in a range of vision than a BD system or an SIL system of the related art.

The tracking servo circuit 19 includes a first tracking servo signal generating system configured with an HPF 20 and a servo filter 21 and a second tracking servo signal generating system configured with an LPF 22 and a servo filter 23.

The first tracking servo signal generating system corresponds to the tracking direction actuator 6 side that holds the objective lens OL, and the second tracking servo signal generating system corresponds to the slide transfer/eccentricity follow-up mechanism 35 side that holds the optical pickup OP.

In the tracking servo circuit 19, the tracking error signal TE is bifurcated and input to the HPF 20 and the LPF 22.

The HPF 20 extracts a component equal to or more than a predetermined cutoff frequency from the tracking error signal TE, and outputs the extracted component to the servo filter 21.

The servo filter 21 calculates a servo calculation based on the output signal of the HPF 20, and generates a first tracking servo signal TS-1.

Further, the LPF 22 extracts a component equal to or less than a predetermined cutoff frequency from the tracking error signal TE, and outputs the extracted component to the servo filter 23.

The servo filter 23 calculates a servo calculation based on the output signal of the LPF 22, and generates a second tracking servo signal TS-2.

The first tracking driver 24 drives the tracking direction actuator 6 by a first tracking drive signal TD-1 generated based on the first tracking servo signal TS-1.

Further, the second tracking driver 25 drives the slide transfer/eccentricity follow-up mechanism 35 by a second tracking drive signal TD-2 generated based on the second tracking servo signal TS-2.

Although not shown, for example, the tracking servo circuit 19 is configured to turn on the tracking servo loop in response to a target address instructed by a control unit that controls the recording/reproducing apparatus in general, and to apply an instruction signal for track jumping or seek movement to the first tracking driver 24 or the second tracking driver 25.

Here, in the tracking servo circuit 19, the cutoff frequency of the LPF 22 is set to a frequency equal to or more than a disc eccentricity period (a period at which a positional relation between an optical spot position and a track position changes with the disc eccentricity). Thus, the slide transfer/eccentricity follow-up mechanism 35 can drive the optical pickup OP to follow the disc eccentricity.

In other words, as a result, a lens shift amount of the objective lens OL caused by the disc eccentricity can be considerably suppressed, and the servo light Lsv or the recording/reproducing light Lrp can be prevented from being deviated from the range of vision (the whole width of vision) of the corresponding hyper lens portion L2b. In other words, it is possible to prevent the occurrence of a situation in which the laser beam deviates from the range of vision of the corresponding hyper lens portion L2b due to the disc eccentricity and recording/reproducing, servo control, or the like is not performed.

Further, the address/relative speed detecting circuit 17 detects address information recorded by wobbling of the servo track Tsv based on the wobbling signal WS from the signal generating circuit 16, and detects a relative speed of the optical disc D and the optical spot (which has the same meaning as a rotational speed of the optical disc D in this case).

As described above, the address detection is performed by demodulating the address information signal recorded by modulation of the wobbling frequency of the servo track Tsv. Further, the relative speed detection is performed by detecting the central frequency of the wobbling frequency of the servo track Tsv.

The address information detected by the address/relative speed detecting circuit 17 is referred to as an address information ADR, and the relative speed information is referred to as a relative speed information Cr.

The rotation control circuit 18 performs rotation control of the spindle motor 11 illustrated in FIG. 7 based on the relative speed information Cr detected by the address/relative speed detecting circuit 17. Specifically, in this case, a driving signal SD to cause the speed represented by the relative speed information Cr to become constant at a set speed is generated, and the spindle motor 11 is rotationally driven by the driving signal SD. Thus, the spindle motor 11 is controlled so that the rotational speed can be constant at a predetermined rotational speed.

Further, in the recording/reproducing apparatus, the dot clock generating circuit 15 is disposed.

The dot clock generating circuit 15 generates the dot clock Dclk based on the light receiving signal Dgd from the gap length servo/dot clock generation photodetector DTgd illustrated in FIGS. 7 and 8. Specifically, the light receiving signal Dgd that has been subjected to I/V conversion by the I/V converting unit 26 is input to the dot clock generating circuit 15, and the dot clock generating circuit 15 generates the dot clock Dclk based on the light receiving signal Dgd.

Figure 11:
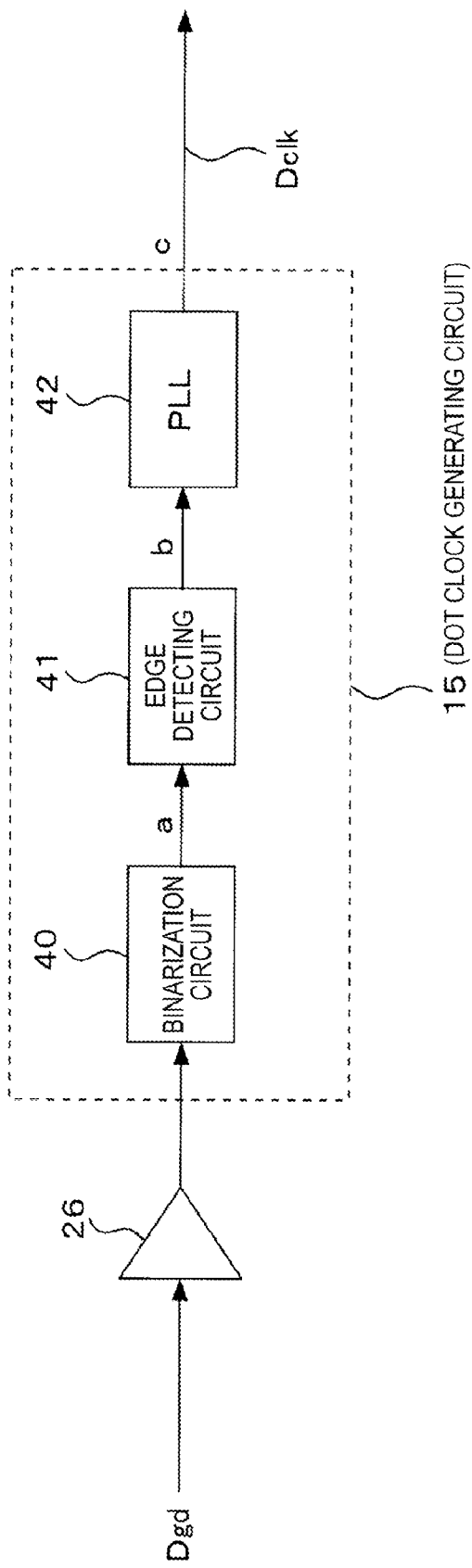
FIG. 11 is a diagram to describe an internal configuration a dot clock generating circuit.

FIG. 11 is a diagram to describe an internal configuration of the dot clock generating circuit 15.

FIG. 11 illustrates the I/V converting unit 26 illustrated in FIG. 9 together with the internal configuration of the dot clock generating circuit 15.

As illustrated in FIG. 11, the dot clock generating circuit 15 includes a binarization circuit 40, an edge detecting circuit 41, and a PLL circuit 42.

The binarization circuit 40 performs binarization on the light receiving signal Dgd by slicing the light receiving signal Dgd having passed through the I/V converting unit 26 using a previously set threshold.

As described above, in the recording surface of the optical disc D, there is a reflectance difference between the dots DT and the other portion. The binarization circuit 40 performs binarization on the light receiving signal Dgd whose amplitude changes due to the reflectance difference.

The edge detecting circuit 41 detects an edge timing of a binary signal obtained by the binarization circuit 40. Specifically, in this case, a rising edge timing of the binary signal is detected, and an edge timing signal representing the edge timing is generated.

The PLL circuit 42 performs a PLL process based on the edge timing signal detected by the edge detecting circuit 41, and generates the dot clock Dclk synchronized with the forming period of the dots DT.

The description will now return to FIG. 9.

The dot clock Dclk generated by the dot clock generating circuit 15 is supplied to a recording processing unit 12 and a binarization processing unit 13.

Data (recording data) to be recorded in the optical disc D is input to the recording processing unit 12. The recording processing unit 12 generates driving signals DL-rp1 to DL-rp6 to drive the recording/reproducing laser diodes LDrp1 to LDrp6 to emit light based on the input recording data and the dot clock Dclk. By each of the driving signals DL-rp1 to DL-rp6, one corresponding recording/reproducing laser diode LDrp is driven to emit light.

Through this operation, the recording data can be simultaneously recorded on the six recording/reproducing tracks Trp1 to Trp6.

Figure 12:
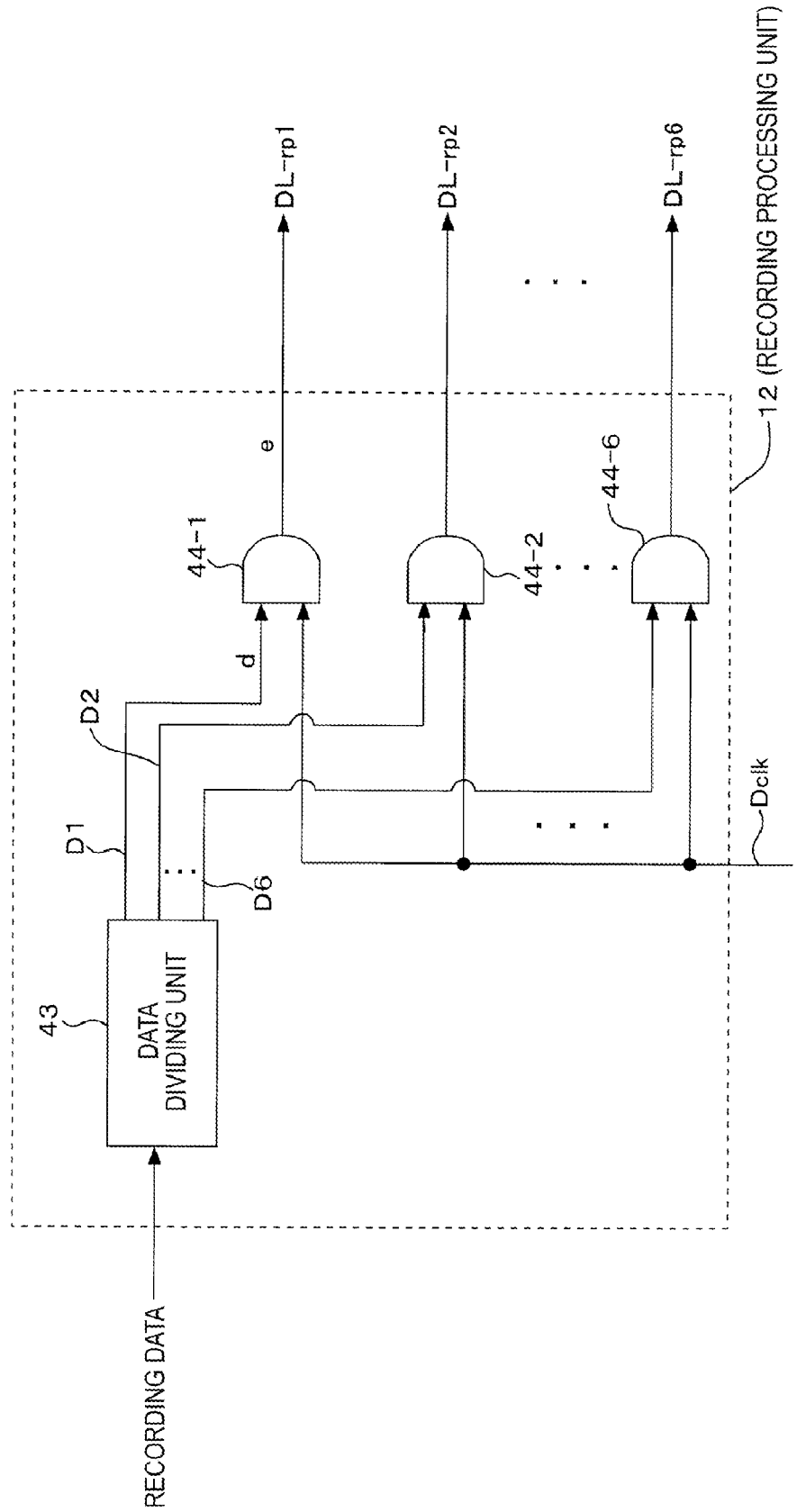
FIG. 12 is a diagram illustrating an internal configuration of a recording processing unit.

FIG. 12 illustrates an internal configuration of the recording processing unit 12.

The recording processing unit 12 includes a data dividing unit 43 and AND gate circuits 44-1 to 44-6.

In order to avoid complication of illustration, as an AND gate circuit 44, only the AND gate circuits 44-1, 44-2, and 44-6 are illustrated in FIG. 12, and the AND gate circuits 44-3 to 44-5 are not shown.

The data dividing unit 43 divides the input recording data into data which is the same in number as the number of the recording/reproducing tracks Trp formed in the track unit TU.

Here, in the present embodiment, when the number of the recording/reproducing tracks Trp formed in the track unit TU is "n", recording is performed such that m-bit data is sequentially allocated to each of the n tracks Trp. In other words, (n×m)-bit data is sequentially and simultaneously recorded.

Specifically, in the present example, under the condition that n is 6, when m is 8 bits, 48-bit data is sequentially and simultaneously recorded.

The data dividing unit 43 sequentially divides (n×m)-bit data of the input recording data into n pieces of data. Thus, n pieces of division data which each include m bits are obtained. Specifically, in the present example, by sequentially equally dividing 48-bit data of the recording data into six, 6 data D1 to D6 which each includes 8 bits are obtained.

One corresponding data D of the data D1 to D6 obtained by the data dividing unit 43 is input to each of the AND gate circuits 44-1 to 44-6. Specifically, the data D1 is input to the AND gate circuit 44-1, the data D2 is input to the AND gate circuit 44-2, the data D3 is input to the AND gate circuit 44-3, the data D4 is input to the AND gate circuit 44-4, the data D5 is input to the AND gate circuit 44-5, and the data D6 is input to the AND gate circuit 44-6.

Further, the dot clock Dclk generated by the dot clock generating circuit 15 is also input to the AND gate circuits 44-1 to 44-6.

Each of the AND gate circuits 44-1 to 44-6 performs a logical AND operation on the input data D and the dot clock Dclk, and outputs the AND operation result as a driving signal DL-rp to drive the recording/reproducing laser diode LD to emit light.

Specifically, an output of the AND gate circuit 44-1 is a driving signal DL-rp1, an output of the AND gate circuit 44-2 is a driving signal DL-rp2, an output of the AND gate circuit 44-3 is a driving signal DL-rp3, an output of the AND gate circuit 44-4 is a driving signal DL-rp4, an output of the AND gate circuit 44-5 is a driving signal DL-rp5, and an output of the AND gate circuit 44-6 is a driving signal DL-rp6.

Figure 13:
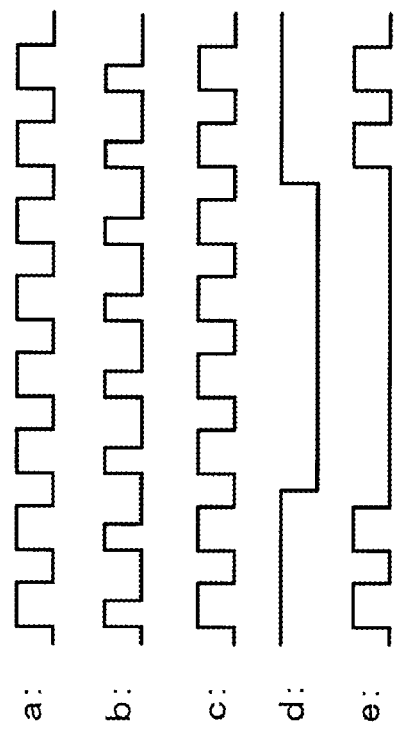
FIG. 13 is a diagram illustrating a timing chart when a laser driving signal is generated at the time of recording.

FIG. 13 illustrates a timing chart when the driving signal DL-rp is generated.

In FIG. 13, "a" represents the binary signal generated by the binarization circuit 40 illustrated in FIG. 11, "b" represents the edge timing signal generated by the edge detecting circuit 41, "c" represents the dot clock Dclk, "d" represents the data D1 output from the data dividing unit 43, and "e" represents the output (DL-rp1) of the AND gate circuit 44-1.

As can be seen from FIG. 13, through the configuration of the recording processing unit 12 illustrated in FIG. 12, it is possible to obtain the driving signal DL-rp capable of applying a recording pulse at the forming position of the dots DT represented by the dot clock Dclk. In other words, through this operation, recording can be properly performed only on the dots DT on which recording is necessary.

Referring back to FIG. 9, the binarization processing unit 13 and a reproducing processing unit 14 are disposed to reproduce information recorded on the recording/reproducing tracks Trp1 to Trp6 of the optical disc D.

The binarization processing unit 13 performs the binarization process on each of the recording signals of the recording/reproducing tracks Trp1, Trp2, Trp3, Trp4, Trp5, and Trp6 based on the light receiving signals Drp1 to Drp6 generated by the recording/reproducing photodetectors DTrp1 to DTrp6 illustrated in FIGS. 7 and 8 and the dot clock Dclk.

Although not shown, at the time of reproducing, each of the recording/reproducing laser diodes LDrp1 to LDrp6 is driven to emit light by reproducing power.

The servo laser diode LDsv is driven to emit light by reproducing power both at the time of recording and at the time of reproducing.

Figure 14:
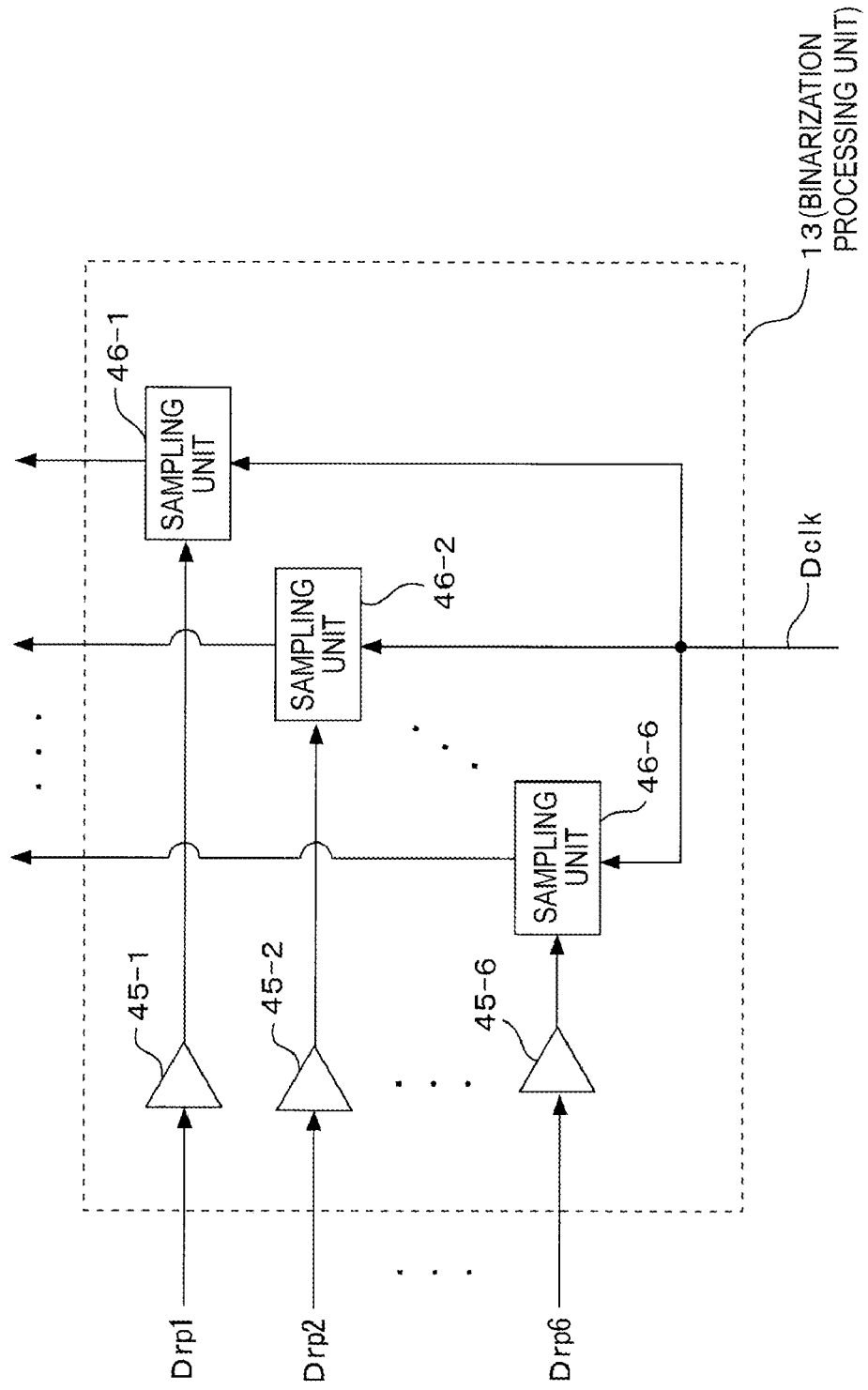
FIG. 14 is a diagram illustrating an internal configuration of a binarization processing unit.

FIG. 14 illustrates an internal configuration of the binarization processing unit 13.

The binarization processing unit 13 includes I/V converting units 45-1 to 45-6 and sampling units 46-1 to 46-6.

In order to avoid complication of illustration, only the I/V converting units 45-1, 45-2, and 45-6 are shown as an I/V converting unit 45, and only the sampling units 46-1, 46-2, and 46-6 are shown as an sampling unit 46, while the I/V converting units 45-3 to 45-5 and the sampling units 46-3 to 46-5 are not shown.

Among the light receiving signals Drp1 to Drp6 obtained by the recording/reproducing photodetectors DTrp1 to DTrp6, one corresponding light receiving signal Drp is input to each of the I/V converting units 45-1 to 45-6. In other words, the light receiving signal Drp1 is input to the I/V converting unit 45-1, the light receiving signal Drp2 is input to the I/V converting unit 45-2, the light receiving signal Drp3 is input to the I/V converting unit 45-3, the light receiving signal Drp4 is input to the I/V converting unit 45-4, the light receiving signal Drp5 is input to the I/V converting unit 45-5, and the light receiving signal Drp6 is input to the I/V converting unit 45-6.

Each of the light receiving signals Drp1 to Drp6 which have been subjected to I/V conversion by the I/V converting units 45-1 to 45-6 is input to one corresponding sampling unit 46 among the sampling units 46-1 to 46-6. In other words, the light receiving signal Drp1 is input to the sampling unit 46-1, the light receiving signal Drp2 is input to the sampling unit 46-2, the light receiving signal Drp3 is input to the sampling unit 46-3, the light receiving signal Drp4 is input to the sampling unit 46-4, the light receiving signal Drp5 is input to the sampling unit 46-5, and the light receiving signal Drp6 is input to the sampling unit 46-6.

Each of the sampling units 46-1 to 46-6 performs sampling on the input light receiving signal Drp according to a timing represented by the dot clock Dclk. Through this operation, the binary signal representing record/non-record of the dot DT can be obtained. Specifically, the binary signal obtained by the sampling unit 46 in this case has a high (or low) level only at the forming position of the dot DT on which recording has been completed and has a low (or high) level at the other portions.

The description will now return to FIG. 9

The binarization processing unit 13 can simultaneously obtain the binary signals for the recording signals of the recording/reproducing tracks Trp in the track unit TU.

The reproducing processing unit 14 obtains reproducing data to reproduce the recording data based on the binary signals input from the binarization processing unit 13.

Specifically, the reproducing processing unit 14 obtains (n×m)-bit data by integrating m-bit data each time m-bit data is obtained as each binary signal. Then, the integrated data is sequentially output as the reproducing data.

Through the above-described configuration of the recording/reproducing apparatus, the recording/reproducing technique can be implemented as the above-described embodiment.

[3-3. Example of Concrete Data Recording Format]

Here, the above description has been made in connection with the example in which the data D1 to D6 obtained by dividing the recording data by m bits is recorded on the recording/reproducing tracks Trp in parallel for simplicity. However, recording on recording/reproducing track Trp may be performed as follows.

Figure 15:
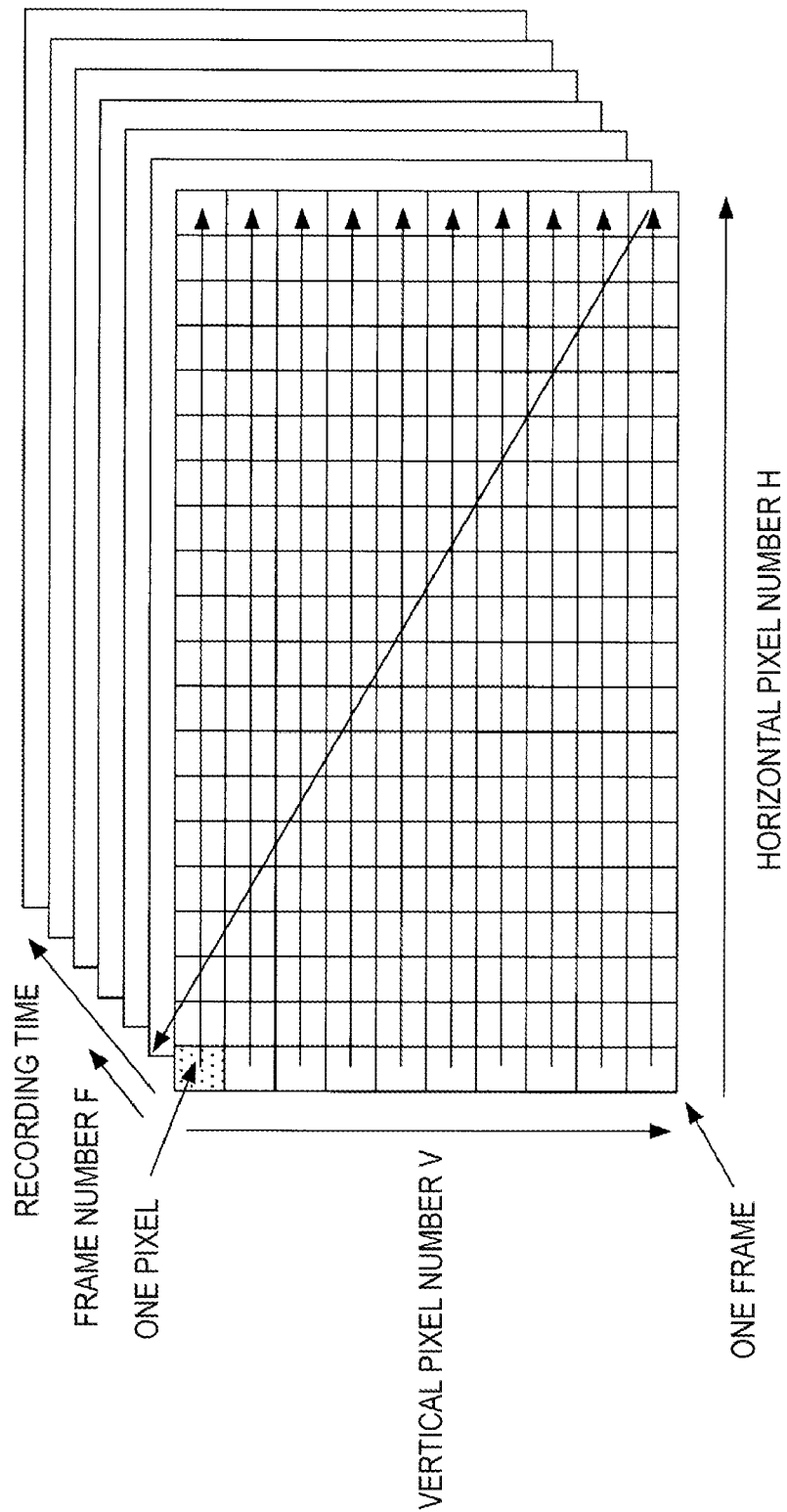
FIG. 15 is an explanatory view to describe moving image data.

First, moving image data illustrated in FIG. 15 is assumed to be data to be recorded. As illustrated in FIG. 15, the moving image data includes consecutive frame image data which each includes pixels of a horizontal pixel number H×a vertical pixel number V.

Here, data corresponding to one pixel is configured with pixel values (brightness values) of red, green, and blue. In this case, the depth (gradation) of a pixel value is assumed to be 16 bits.

In an exemplary recording format, 48 bits (=six tracks of the recording/reproducing tracks Trp1 to Ttp6×8 bits) are used as one data unit, and one data unit is allocated to recording of pixel values corresponding to one pixel.

Figure 16:
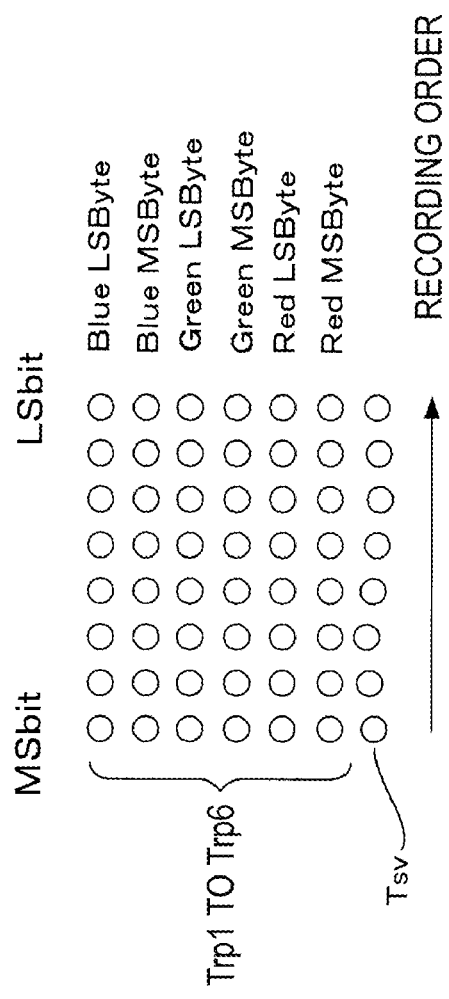
FIG. 16 is a diagram schematically illustrating allocation of recording data to each track.

FIG. 16 schematically illustrates allocation of recording data in this case.

In the recording format in this case, a total of six data is obtained by dividing pixel values of R, G, and B clocks configuring one pixel into MSByte and LSByte (dividing by 8 bits), and each data is allocated to one corresponding track Trp among the recording/reproducing tracks Trp1 to Trp6.

In the example illustrated in FIG. 16, LSByte of a B pixel value is allocated to the recording track Trp1, MSByte of a B pixel value is allocated to the recording track Trp2, LSByte of a G pixel value is allocated to the recording track Trp3, and MSByte of a G pixel value is allocated to the recording track Trp4. Further, LSByte of an R pixel value is allocated to the recording track Trp5, and MSByte of an R pixel value is allocated to the recording track Trp6.

Thus, a 48-bit area (=the six recording/reproducing tracks Trp×8 bits) is allocated to recording of data corresponding to one pixel. In other words, pixel values of R, G, and B corresponding to one pixel are shared by a plurality of recording/reproducing tracks Trp (a plurality of recording/reproducing lights Lrp) and recorded in parallel.

Further, as illustrated in FIG. 16, the recording sequence of each byte data is an order of MSbit→LSbit.

As indicated by an arrow in FIG. 15, recording of data of each pixel is performed such that scanning is performed in order of horizontal lines.

Here, as can be understood from the above description, the recording format in this case is characterized in that raw data of a moving image is recorded on the optical disc D.

Further, actually, additionally data such as an error correction code (ECC) of a predetermined length may be included in units of data corresponding to a predetermined number of pixels. For example, additional data such as an error correction code corresponding to 2048 pixels (12 Kbytes) and address information may be included in units of data corresponding to 8192 pixels (49 Kbytes).

Here, when the recording format is implemented as described above, pixel data (pixel values of R, G, and B) configuring each frame image data of moving image data is input to the data dividing unit 43 illustrated in FIG. 12 in order of horizontal lines as recording data. In this case, the data dividing unit 43 divides every 48 bits of the input recording data into data D1 to data D6 so that 8-bit data can be allocated to each recording/reproducing track Trp as described with reference to FIG. 16.

Further, when additional data such as an error correction code is included, data in which additional data of a predetermined length is included in units of data corresponding to a predetermined number of pixels is preferably input to the data dividing unit 43 as "recording data", At this time, the additional data other than the pixel data may be also divided into data D1 to data D6 so that 48 bits (=the six recording/reproducing tracks Trp×8 bits) are sequentially recorded as one data unit.

For the sake of confirmation, in the present embodiment, raw data can be directly recorded on the optical disc D without using a modulation code as described above. This is because a pattern medium in which a record/non-record (or erase) of the dot DT is represented by a code bit such as "0" or "1" is employed as a recording medium, and the servo track Tsv which is not used for recording/reproducing is formed to run in parallel separately from the recording/reproducing track Trp.

In the typical optical disc, when a maximum inversion interval of a recording code is too long, it leaks into focus servo (gap length servo) or tracking servo and disturbs servo, or it is remarkably difficult to reproduce a bit clock of a recording code by the PLL. Thus, since it is necessary to reproduce a signal recorded by a combination of a mark (or a pit) and a definite length of space, it is necessary to limit a maximum inversion interval of a recording code. In other words, it is necessary to use a run length limited code as a recording modulation code. However, since raw data has a maximum inversion interval of an infinite length, it is difficult to record raw data as is.

On the other hand, according to the above-described configuration of the present embodiment, since recording is not performed on the servo track Tsv, the gap length servo or the tracking servo performed using the servo track Tsv is not disturbed, and the dot clock Dclk can be appropriately generated from the servo track Tsv. Thus, it is possible to appropriately determine a record/non-record (or erase) of the dot DT of each recording/reproducing track Trp, that is, a code "0" or "1" at a timing represented by the dot clock Dclk. For this reason, even if the same code is continued, no problem occurs, and it is unnecessary to limit a maximum inversion interval of a recording code.

As a result, according to the present embodiment, a one-to-one correspondence between one dot DT which is a small record carrier and a coded 1 bit and a one-to-one correspondence between a physical dot clock and a data bit clock can be implemented, and so pixel raw data of a moving image can be recorded in units of bits in association with one bit on the optical disc D which is a pattern medium.

<4. Modified Embodiment>

The embodiment of the present application has been described so far, but the present application is not limited to the above-described concrete example.

For example, in the above description, the single servo track Tsv runs in parallel to the six recording/reproducing tracks Trp. However, the number of the recording/reproducing tracks Trp formed in the track unit TU is not limited to six.

As the number of the recording/reproducing tracks Trp configuring the track unit TU increases, data recoding capacity of the optical disc D is improved (because a proportion of the forming area of the servo track Tsv not used in recording/reproducing occupies in the optical disc D decreases).

Further, when the number of the recording/reproducing tracks Trp in the track unit TU is a multiple of 3, it is desirable when pixel values of R, G, and B are recorded.

Further, the track unit TU is formed to have a spiral shape but may be formed in a concentric circular shape.

Further, the optical recording medium of the present application is not limited to a disc-shaped recording medium. For example, a recording medium of a rectangular shape such as a card shape may be used.

In the case of the rectangular shape, a plurality of track units TU are formed to be arranged in parallel. In this case, the recording/reproducing apparatus may be configured to sequentially perform recording/reproducing on the track units TU while sliding the optical pickup OP or optical recording medium in a forming direction (a line direction) of the track unit TU. In this case, relative speed control is performed by controlling the slide speed of the optical pickup OP or the optical recording medium.

The above description has been made in connection with the example in which the small record carrier has a cylindrical shape, but the small record carrier may have a different shape such as a spherical shape.

The above description has been made in connection with the example in which the reflected light of the servo light Lsv from the servo track Tsv is split by the HOE 8 and individually detected, but this configuration is optional.

For example, when a photodetector DTsw which is a division detector is disposed as a photodetector that receives the reflected light of the servo light Lsv and a sum signal of light receiving signals of the photodetector DTsw is used for generation of a dot clock and the gap length servo, it is unnecessary to split and individually detect the reflected light of the servo light Lsv.

Further, the above description has been made in connection with the example in which an overall shape of the hyper lens portion L2b is almost a hemispherical shape (a shape that does not satisfy a hemispherical shape), but may be a different shape such as a hemispherical shape.

Further, an SIL having a super hemispherical shape has been used as the SIL portion L2a, but an SIL having a hemispherical shape may be used.

(1) An optical recording medium, comprising:
  a recording target track that is a track on which small record carriers are arranged and on which information recording is performed by modulating the small record carriers through light irradiation; and
  a wobbling track on which the small record carriers are arranged in a wobbling manner,
  wherein a single wobbling track is formed to run parallel to a set of a plurality of recording target tracks.
(2) The optical recording medium according to (1),
  wherein there is a reflectance difference between a portion in which the small record carrier is formed and the other portion.
(3) The optical recording medium according to (2),
  wherein recording target tracks whose number is a multiple of 3 are formed as the set of the plurality of recording target tracks to which the single wobbling track is formed to run parallel.
(4) A recording/reproducing apparatus that performs recording/reproducing by a near field method on an optical recording medium that includes a recording target track that is a track on which small record carriers are arranged and on which information recording is performed by modulating the small record carriers through light irradiation, and a wobbling track on which the small record carriers are arranged in a wobbling manner, wherein a single wobbling track is formed to run parallel to a set of a plurality of recording target tracks, the recording/reproducing apparatus comprising:
  a light irradiating/receiving unit that is configured to irradiate a plurality of recording light beams or reproducing light beams to be irradiated to the plurality of recording target tracks and a wobbling track light beam to be irradiated to the wobbling track to the optical recording medium through a common objective lens, at the time of recording or at the time of reproducing, and individually receive reflected light beams of the plurality of reproducing light beams and the wobbling track beam from the optical recording medium;
  a gap length error signal generating unit that generates a gap length error signal representing an error of a gap length representing a distance between an objective surface of the objective lens and a recording surface of the optical recording medium based on a light receiving signal on the wobbling track light beam obtained by the light irradiating/receiving unit;
  a gap length control unit that controls the gap length based on the gap length error signal;
  a tracking servo control unit that generates a tracking error signal based on the light receiving signal on the wobbling track light beam, and displaces the objective lens in a tracking direction based on the tracking error signal;
  an address information detecting unit that detects address information recorded by modulation of a wobbling period of the wobbling track based on the light receiving signal on the wobbling track light beam;
  a clock generating unit that generates a clock which is synchronized with a forming period of the small record carrier based on the light receiving signal on the wobbling track light beam;
  a recording control unit that performs emission driving to emit the plurality of recording light beams at a timing according to the clock and executes recording on the plurality of recording target tracks; and
  a binarization processing unit that binarizes each of recording signals of the plurality of recording target tracks based on a light receiving signal on each of the plurality of reproducing light beams obtained by the light irradiating/receiving unit and the clock.
(5) The recording/reproducing apparatus according to (4), further comprising:
  a relative movement driving unit that drives the optical recording medium or the light irradiating/receiving unit such that an optical spot formed on the optical recording medium by the light irradiating/receiving unit relatively moves on the optical recording medium;
  a relative speed detection unit that detects a relative movement speed of the optical spot based on the reflected light beam of the wobbling track light beam; and
  a speed control unit that controls the relative movement driving unit based on the relative movement speed detected by the relative speed detection unit.
(6) The recording/reproducing apparatus according to (4) or (5),
  wherein the recording control unit performs control such that one bit of data which has not been subjected to run length limited coding is recorded on one small record carrier.
(7) The recording/reproducing apparatus according to (6),
  wherein image data in which data of one pixel contains pixel values of red, green, and blue is sequentially supplied to the recording control unit, and
  the recording control unit performs control such that pixel values of red, green, and blue corresponding to one pixel are divided and recorded in parallel by the plurality of recording light beams.
(8) The recording/reproducing apparatus according to any one of (4) to (7),
  wherein the objective lens includes a plurality of hyper lens portions corresponding to the plurality of recording light beams and the wobbling track light beam, each of the hyper lens portions including a first thin film having a negative dielectric constant and a second thin film having a positive dielectric constant that are alternately stacked, and
  the light irradiating/receiving unit is configured to irradiate the plurality of recording light beams and the wobbling track light beam to the optical recording medium through the hyper lens portions, respectively.
(9) A recording/reproducing method of performing recording/reproducing by a near field method on an optical recording medium that includes a recording target track that is a track on which small record carriers are arranged and on which information recording is performed by modulating the small record carriers through light irradiation, and a wobbling track on which the small record carriers are arranged in a wobbling manner, wherein a single wobbling track is formed to run parallel to a set of a plurality of recording target tracks, the recording/reproducing method comprising:

generating a gap length error signal representing an error of a gap length representing a distance between an objective surface of the objective lens and a recording surface of the optical recording medium based on a light receiving signal on the wobbling track light beams obtained by a light irradiating/receiving unit that is configured to irradiate a plurality of recording light beams or reproducing light beams to be irradiated to the plurality of recording target tracks and a wobbling track light beam to be irradiated to the wobbling track to the optical recording medium through a common objective lens, at the time of recording or at the time of reproducing, and individually receive reflected light beams of the plurality of reproducing light beams and the wobbling track light beam from the optical recording medium;

controlling the gap length based on the gap length error signal;

generating a tracking error signal based on the light receiving signal on the wobbling track light beam, and displacing the objective lens in a tracking direction based on the tracking error signal;

detecting address information recorded by modulation of a wobbling period of the wobbling track based on the light receiving signal on the wobbling track light beam;

generating a clock which is synchronized with a forming period of the small record carrier based on the light receiving signal on the wobbling track light beam;

performing emission driving to emit the plurality of recording light beams at a timing according to the clock and executing recording on the plurality of recording target tracks; and binarizing each of recording signals of the plurality of recording target tracks based on a light receiving signal on each of the plurality of reproducing light beams obtained by the light irradiating/receiving unit and the clock.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical recording medium, comprising:
a recording target track that is a track on which small record carriers are arranged and on which information recording is performed by modulating the small record carriers through light irradiation; and
a wobbling track on which the small record carriers are arranged in a wobbling manner over the entire wobbling track,
wherein a single wobbling track is formed to run adjacent and parallel to a set of a plurality of recording target tracks.

2. The optical recording medium according to claim 1, wherein there is a reflectance difference between a portion in which the small record carrier is formed and the other portion.

3. The optical recording medium according to claim 2, wherein recording target tracks whose number is a multiple of 3 are formed as the set of the plurality of recording target tracks to which the single wobbling track is formed to run parallel.

4. The optical recording medium of claim 1, wherein the wobbling track is configured to provide a clock for at least one of recording information to and reproducing information from the set of the plurality of recording target tracks.

5. The optical recording medium of claim 1, wherein the wobbling track is configured to provide a tracking error signal.

6. The optical recording medium of claim 1, wherein the wobbling track is configured to provide modulated address information.

7. The optical recording medium of claim 1, wherein the single wobbling track is the only wobbling track formed to run parallel to the set of the plurality of recording target tracks.

8. The optical recording medium of claim 1, wherein the wobbling track includes a number of wobbling tracks that is less than a number of tracks included within the set of the plurality of recording target tracks.

9. An optical recording medium, comprising:
a recording target track that is a track on which small record carriers are arranged and on which information recording is performed by modulating the small record carriers through light irradiation; and
a wobbling track on which the small record carriers are arranged in a wobbling manner,
wherein a single wobbling track is formed to run adjacent and parallel to a set of a plurality of recording target tracks, and
wherein the wobbling track is configured to have a wobbling frequency that provides a relative speed of the optical recording medium.

10. An optical recording medium, comprising:
a recording target track that is a track on which small record carriers are arranged and on which information recording is performed by modulating the small record carriers through light irradiation; and
a wobbling track on which the small record carriers are arranged in a wobbling manner,
wherein a single wobbling track is formed to run adjacent and parallel to a set of a plurality of recording target tracks, and
wherein the wobbling track is used to determine a gap distance between the optical recording medium and an objective surface of an objective lens.

* * * * *